United States Patent [19]
Gerber

[11] Patent Number: 5,214,079
[45] Date of Patent: May 25, 1993

[54] ACCELERATORS FOR CURING PHENOLIC RESOLE RESINS

[75] Inventor: Arthur H. Gerber, Louisville, Ky.

[73] Assignee: Borden, Inc., Columbus, Ohio

[21] Appl. No.: 943,065

[22] Filed: Sep. 10, 1992

Related U.S. Application Data

[60] Division of Ser. No. 616,879, Nov. 21, 1990, Pat. No. 5,182,346, which is a continuation-in-part of Ser. No. 562,206, Aug. 2, 1990, Pat. No. 5,096,983.

[51] Int. Cl.$^5$ .............................................. B22C 1/22
[52] U.S. Cl. .................................... 523/145; 523/146; 523/147; 525/480; 525/504; 525/508; 528/129; 524/594; 524/596
[58] Field of Search ........................ 523/145, 146, 147; 525/480, 504, 508; 524/594, 596; 528/129

[56] References Cited

U.S. PATENT DOCUMENTS

| | | | |
|---|---|---|---|
| Re. 32,720 | 7/1988 | Lemon et al. | 523/145 |
| Re. 32,812 | 12/1988 | Lemon et al. | 523/145 |
| 2,712,533 | 7/1955 | Mitchell | 260/25 |
| 2,869,191 | 1/1959 | Cooper et al. | 22/147 |
| 2,869,194 | 1/1959 | Cooper | 22/193 |
| 2,869,196 | 1/1959 | Cooper et al. | 22/193 |
| 2,913,787 | 11/1959 | Cooper | 22/193 |
| 3,624,247 | 11/1971 | Gladner | 260/29.3 |
| 3,666,703 | 5/1972 | Murata | 260/29.3 |
| 4,011,186 | 3/1977 | Higinbottom | 260/29.3 |
| 4,210,295 | 8/1986 | Adams | 521/112 |
| 4,794,051 | 12/1988 | Gupta | 428/524 |
| 4,939,188 | 7/1990 | Gerber | 523/146 |
| 4,964,917 | 12/1990 | Bobrowski | 101/804 |

FOREIGN PATENT DOCUMENTS

| | | |
|---|---|---|
| 0094165 | 11/1983 | European Pat. Off. |
| 0243172 | 11/1987 | European Pat. Off. |
| 60-90251 | 5/1985 | Japan |

OTHER PUBLICATIONS

Roczniak, Krystyna, "Selected Catalytic Polycondensation Compounds" Zesz. Nauk.-Wyzsza Inz. Radomiu, Material Ozn. Chem. Technol. Obuwia., vol. 8, 1985, p. 283.

Primary Examiner—John Kight, III
Assistant Examiner—Richard Jones
Attorney, Agent, or Firm—George P. Maskas; Kenneth P. Van Wyck; Dennis H. Rainear

[57] ABSTRACT

There are disclosed methods and compositions for accelerating the hardening of phenolic resole resins having a pH of about 4.5 to 9.5 with lightburned magnesium oxide or magnesium hydroxide, with or without the addition of an ester functional hardening agent. Acceleration of hardening is achieved by incorporating into said compositions an effective quantity of a material which: increases the solubility of magnesium in the hardenable mixture; by certain amines; or by certain chelating agents. Accelerator compounds include those which provide chloride, sulfamate, nitrate, formate, and phosphite anions as well as selected tertiary amines.

14 Claims, No Drawings

ACCELERATORS FOR CURING PHENOLIC RESOLE RESINS

This is a divisional application of my copending application Ser. No. 07/616,879 which was filed on Nov. 21, 1990, now U.S. Pat. No. 5,182,346 and which in turn is a continuation in-part of my application Ser. No. 562,206 which was filed on Aug. 2, 1990, now U.S. Pat. No. 5,096,983.

BACKGROUND OF THE INVENTION

This application is a continuation-in-part of my application serial number 07/562206, which was filed on Aug. 2, 1990.

This invention relates to methods and compositions for accelerating the hardening of phenolic resole resin binder compositions which are hardened with magnesium oxide or magnesium hydroxide alone or together with an ester functional hardening agent. Such hardening can take place at about room temperature.

It is often desirable to accelerate or shorten the time it takes for phenolic resole resins to harden by the use of a lightburned magnesium oxide or magnesium hydroxide hardener, alone or together with an ester functional hardening agent, particulary if such acceleration does not significantly affect the eventual hardness, tensile strength, and other desirable properties of the hardened or cured resin. This is particularly the case in cooler climates and lower temperatures.

Magnesium oxide or hydroxide, with or without an ester functional hardening agent, are used as the hardening agents in this invention.

Applicant has found that the hardening of phenolic resole resin compositions admixed with hardening quantities of lightburned magnesium oxide or magnesium hydroxide, either alone or together with an ester functional hardening agent can be accelerated by use of certain amines or compounds which increase the solubility of magnesium from the hardener which is admixed with the resin. Illustrative of accelerators are compounds which provide anions of chloride, sulfate, nitrate, and sulfamate as well as various amino compounds such as 2,4,6-tris(dimethylaminomethyl)phenol.

Lightburned magnesium oxide and magnesium hydroxide are well known room temperature hardening agents for phenolic resole resins. Furthermore, magnesium oxide and magnesium hydroxide are used as the condensation catalysts for the manufacture of phenol-formaldehyde resole resins from phenol and formaldehyde. Additionally, relatively inactive magnesia, e.g., periclase or refractory grade magnesia, is a conventional refractory which is often bound into various shapes with phenolic resole resins; however the periclase is relatively inactive and is not used as a hardener. Illustrative of references which disclose the use of magnesium oxide or magnesium hydroxide to harden phenolic resole resins in various types of compositions, there can be mentioned U.S. Patents: U.S. Pat. No. 2,869,194 of Jan. 20, 1959 to R. H. Cooper; U.S. Pat. No. 2,869,196 of Jan. 20, 1959 to R. H. Cooper; U.S. Pat. No. 2,913,787 of Nov. 24, 1959 to R. H. Cooper; U.S. Pat. No. 3,666,703 of May 30, 1972 to T. Murata et al; U.S. Pat. No. 2,712,533 of Jul. 5, 1955 to J. S. Mitchell; U.S. Pat. No. 2,424,787 of Jul. 29, 1947 to W. H. Adams, Jr.; and U.S. Pat. No. 4,794,051 of Dec. 27, 1988 to M. K. Gupta.

The U.S. Pat. No. 4,794,051 Gupta patent also mentions the use of a class of ester functional hardening agents namely, lactones, which are used together with the magnesium hardeners, but preferably in admixture with calcium hardeners. The U.S. Pat. No. 2,869,194 Cooper patent also mentions that magnesium oxychloride and magnesium oxysulfate, which can be prepared by mixing magnesium oxide powder with an aqueous solution of magnesium chloride or its equivalent or magnesium sulfate or its equivalent, frequently provide shorter hardening times as compared to the magnesium oxide alone. The U.S. Pat. No. 2,913,787 Cooper patent also mentions the optional inclusion in his compositions of "novolak type" phenolics as well as optional inclusion of hexamethylene tetramine or equivalent curing agent or accelerator for phenolic resins, including ethylene diamine, diethylene triamine and the like relatively low molecular weight polyamines and paraformaldehyde.

U.S. patent application Ser. No. 450,989 entitled "Phenolic Resin Compositions" filed Dec. 15, 1989 with P.H.R.B. Lemon, J. King, H. Leoni, G. Murray, and A. H. Gerber as inventors, which is based on GB 8829984.7 filed Dec. 22, 1988, discloses the preparation of phenolic resole resins with alkali or alkaline earth metal compounds as the basic catalyst and the subsequent room temperature hardening of such resins with an esterified phenolic as the ester functional hardening agent together with various bases, including oxides and hydroxides of magnesium and calcium.

European Patent Application Publication Number 0094165, which was published on Nov. 16, 1983 with P.H.R.B. Lemon et al as inventors, has broad recitations which mention the use of various alkaline materials including magnesium oxide (magnesia) for condensing phenol and formaldehyde to form phenol-formaldehyde resins and for further increasing the alkalinity of such resins which use ester functional agents for hardening the phenolic resin. European Patent Application Publication No. 0243,172, now U.S. Pat. No. 4,831,067 of May 16, 1989 which was published on Oct. 28, 1987 and lists P.H.R.B. Lemon et al as inventors, has recitations similar to those of the above-mentioned 0094165 publication.

U.S. Pat. No. 4,939,188, which issued on Jul. 3, 1990 with A. H. Gerber as inventor, discloses the use of lithium ion generating alkalizing agents in resole resin binder compositions which, when hardened by an ester functional curing agent, exhibit tensile and compressive strengths superior to that obtained from compositions using sodium or potassium ion generating alkalizing agents.

U.S. Pat. No. 4,011,186 of Mar. 8, 1977 to Higgenbottom as well as U.S. Pat. No. 4,216,295 of Aug. 5, 1980 to Dahms relate to phenolic resoles catalyzed with alkaline earth metal hydroxides and neutralized with oxalic acid or its acid salts which provide stable, inert, insoluble oxalate salts dispersed in said resole and, additionally increases the viscosity of the resole resin.

U.S. Pat. No. 3,624,247 of Nov. 30, 1971 to Gladney et al relates to the removal of residual calcium catalyst used in the production of phenolic resins. The residual calcium catalyst is removed by treatment with an alkaline solution of an ammonium salt which forms an insoluble salt with calcium upon pH adjustment. Soluble ammonium compounds used in the process of the 247 patent are listed as sulfate, phosphate, and carbonate.

U.S. Pat. No. Re 32,720 of Jul. 26, 1988 and U.S. Pat. No. Re 32,812 of Dec. 27, 1988 to P.H.R.B. Lemon et al are further illustrative of the literature which discloses room temperature hardening of highly alkaline phenol-formaldehyde resole resins with an ester hardening (curing) agent.

Japanese Kokoi Tokkyo Koho JP 60/90251 of May 21, 1985 to Kyushu Refractories Co., Ltd., which discloses the cold-hardening of a thermosetting resole resin by the use of ethylene carbonate and magnesium oxide.

My initially mentioned parent patent Application Ser. No. 07/562206 discloses materials such as various anions for retarding the hardening of phenolic resole resins with magnesium hardening agents.

SUMMARY OF THE INVENTION

It has now been found that the room temperature hardening of phenolic resole resin compositions admixed with hardening quantities of lightburned magnesium oxide or magnesium hydroxide, either alone or together with an ester functional hardening agent, can be accelerated with certain amines or with materials which increase the solubility of magnesium in the reaction mixture. Further, it has been found that: the use of a relatively low surface area lightburned magnesium oxide when admixed with a higher surface area magnesium oxide has little effect in accelerating the hardening of the phenolic composition beyond that due to the high surface area material but provides greater strength to the composition on thermal curing; the use of lithium carbonate is both an accelerator and a strength improver in the phenolic composition; and when sulfamate accelerators are used with low molecular weight phenolics, having a high free phenol content; the strength of the composition is improved. The phenolic resole resins used in this invention generally have a pH of about 4.5 to 9.5.

In one aspect of the invention, compositions and methods for preparing binders having a shortened hardening time are provided by mixing the phenolic resole resin with a magnesium hardening agent with or without an ester functional hardening agent and an accelerator.

In another aspect of this invention, the above-mentioned compositions and methods together with an aggregate are used for patching or resurfacing various rigid substrates such as concrete and asphaltic structures.

In another aspect, a shaped article is provided; the shaped article comprising an aggregate material bonded together by a resin binder; the binder comprising a hardened phenol-formaldehyde resin hardened in the presence of a magnesium hardening agent and an accelerator, with or without an ester functional hardener.

Illustrative of accelerators, there can be mentioned materials which provide anions of chloride, sulfate, nitrate, sulfamate, phosphites, corresponding acid addition salts of basic nitrogen compounds and compounds of the formula:

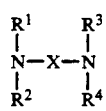

wherein: X is a lower aliphatic hydrocarbon group, $R^1$ and $R^2$ are alkyl or together with the nitrogen to which they are attached form a heterocycle and $R^3$ and $R^4$ can be hydrogen, alkyl, or when $R^3$ and $R^4$ are taken together with the nitrogen to which they are attached form a heterocyclic group.

ADVANTAGES

The processes and compositions of this invention provide a means for accelerating the rate of hardening of phenolic resole resins with magnesium hardening agents over a wide temperature range such as about 60° F. to 120° F. by use of small amounts of amines or various chemicals which increase the solubility of magnesium in the binder composition and accelerate the hardening of the resin. One of the variables affecting the rate of hardening of phenolic resole resins is temperature. Lower temperatures decrease the rate of hardening. Therefore, by use of the accelerators of this invention, the hardening rate can be accelerated over a wide range of temperatures such as room or ambient temperatures, particularly in cooler climates or work places having lower temperatures. By use of the accelerators of this invention, the hardening rate can be accelerated at low temperatures in order to maintain a desirable processing time while developing adequate strength.

The methods and compositions of this invention can also affect reaction rate of the phenolic resole resin by selection of surface area of the magnesia to be used, by choice of the specific accelerator, and, optionally, by choice of the specific ester as well as the quantities of the hardeners and accelerators.

Preferred methods and compositions of this invention utilize an ester functional hardening agent together with the magnesium hardening agent since the reaction rate of phenolic compositions are strongly affected when an ester is used with the lightburned magnesia or magnesium hydroxide hardener together with an accelerator. Furthermore, the hardened phenolic resole resins, which use both a magnesium hardening agent and an ester functional hardening agent, have greater compressive and tensile strengths as well as greater resistance to aqueous organic acids as compared to phenolic resole resins which have been hardened only with magnesium oxide or magnesium hydroxide.

The methods and compositions of this invention possess many advantages as compared to curing of phenolic resole resins with esters alone as shown in U.S. Pat. No. Re 32,720 of Jul. 26, 1988 to Lemon et al and U.S. Pat. No. Re 32,812 of Dec. 27, 1988 to Lemon et al. The processes and compositions of those patents require alkali metal hydroxides and for practical applications, the resins have a pH of greater than 12. In contrast to those patents, the present invention involves substantially lower pH values, and there is no need for alkali metal hydroxides or salts. The compositions and methods of the present invention have many advantages over those which do require high alkalinity, e.g., pH of 10 or 12 or more, particularly in view of the high alkali metal concentration required for the highly alkaline compositions. Illustratively, the phenolics of the present invention have: Better shelf stability; improved stability of resin color in relation to time and exposure to the atmosphere; lower viscosities at higher solids levels which, among other things, increases wettability of aggregate or substrate which, in turn, increases bond strength; safer material and waste handling properties; a higher density and less porosity on curing at the higher solids levels for resin, compositions, e.g., such as those containing aggregate which, in turn, increases strength and resistance to solvents and aqueous media; and improved stability with aggregates normally attacked by sodium or potassium at a high pH and improved stability to glass or polyester fiber. Excess alkali can result in strength loss, e.g., see Lemon et al. U.S. Pat. No. Re. 32,812, Table 4, wherein the effect of KOH/phenol molar ratio shows steady decrease in compressive strength of resoles as the mole ratio is increased from 0.68 (5032 psi) to 1.02 (4271 psi). In contrast to this, an excess of the magnesium hardener can increase strength and also insolubility of the final composite because of the divalent cross linking by magnesium in comparison with chain termination by use of sodium or potassium alkalies.

Accelerators are also advantageous for reducing the strip time of molded or cast materials or simply to increase the hardening rate, particularly when temperatures are significantly below 70° F.

DETAILED DESCRIPTION OF THE INVENTION

Magnesium Oxide and Magnesium Hydroxide Hardening Agents

The term "accelerator" as used herein refers to a material which speeds up, hastens, or simply accelerates gelation or hardening of the phenolic resole resin in the methods and compositions of this invention such as the hardenable binders which contain the phenolic resole resin, a magnesium hardener, and optionally an ester functional hardening agent. Some of the accelerators of this invention appear to work by increasing the amount of magnesium or magnesium compound in solution, i.e., by changing the solubility of magnesium compound in the hardenable mixture.

The term "hardening agent" is used herein to denote a material which increases the rate of hardening of a phenolic resole resin, e.g., at room or ambient temperature (R.T.). Hardening is attained with increases in viscosity and gelation to form a solid which is firm to the touch and generally inflexible. The hardenable binder compositions of this invention which contain a phenolic resole resin, magnesium hardener and optionally an ester functional hardening agent but without an accelerator will generally be hard within about 24 hours of standing at 75° F. Although such hardening can also be referred to as "curing," the "hardening" or "curing" with hardening agents does not develop the tensile and compressive strengths of a thermal cure.

By the term "room temperature hardening" we mean the hardening of compositions of this invention at temperatures of about 60° F. to 90° F., particularly about 65° F. to 80° F. However, the use of accelerators in the processes and compositions of this invention accelerate the hardening of compositions of this invention at lower and higher temperatures such as 60° F. to 120° F. In addition to room temperature hardening, or hardening at ambient temperatures such as those of about 60° F. to 120° F., the compositions of this invention can be thermally cured after hardening by the hardening agents or the compositions can be thermally cured prior to such hardening. The term "thermal curing" as used herein means curing of the composition at a temperature of at least 170° F. and generaly at a temperature of at least 212° F.

The magnesium hardening agents are magnesium hydroxide, lightburned magnesium oxide, or other magnesium oxide which has the hardening activity for phenolic resole resins of lightburned magnesium oxide such as that having a surface area of at least 10 square meters per gram (10 $m^2/g$). Lightburned magnesium oxide is the preferred magnesium hardening agent because magnesium hydroxide gives lower strengths to the hardened compositions.

Small quantities of calcium hydroxide, calcium oxide, or calcined dolomite (doloma) can also be added as a hardening agent. However, the use of calcium oxide, calcined dolomite, or calcium hydroxide alone or in high quantities together with the magnesium hardeners have serious shortcomings. Thus, calcium based oxides, including calcined dolomite, or hydroxides are highly basic and react too quickly, thus greatly reducing the mix working time. However, minor quantities, e.g., from about 1% to less than 50% by weight based on the weight of the magnesium hardening agent, of these calcium containing compounds, when mixed with the magnesium hardening agents, can be used to replace an equivalent weight of the magnesium hardening agents. Preferably such minor quantities do not exceed about one-fourth of the total weight of the magnesium oxide or magnesium hydroxide hardening agent. An additional shortcoming in the use of calcium based oxides is that they can insolubilize some of the accelerators.

Reactivity and surface area of magnesium oxide (magnesia) differ greatly depending on the procedure used for manufacture of the magnesia. Lightburned grades of magnesium oxide are calcined at temperatures ranging from about 1600° to 1800° F. Hardburned grades are calcined at temperatures ranging from about 2800° to 3000° F. Deadburned or periclase grade of magnesium oxide is calcined at temperatures of over 4000° F. The lightburned grades are generally available in powder or granulated form while hardburned grades are avaialble in kiln run, milled, or screened sizes. Periclase is generally available as briquettes and as screened or milled fractions. There are large differences in surface areas for the various magnesias. Thus, lightburned magnesia has a surface area of about 10 to 200 or more square meters per gram ($m^2/g$). Hardburned magnesia has a surface area of about one square meter per gram, whereas deadburned magnesia has a surface area of less than one square meter per gram. Magnesia which is conventionally used as a refractory aggregate is the deadburned or periclase magnesia. Neither hardburned nor deadburned magnesia are effective hardening agents. It is the lightburned magnesia which is an effective hardening agent. Magnesia products having different surface areas can be obtained from the Martin Marietta Company under the designator of MAGCHEM Magnesium Oxide Products. Illustratively, MAGCHEM 30 has a surface area of about 25 square meters per gram. MAGCHEM 50 has a surface area of about 65 square meters per gram whereas MAGCHEM 200D has a surface area of about 170 square meters per gram.

One of the variables for viscosity increase, formation of gel and subsequent hardening of a phenolic resole resin is dependent on the surface areas of the lightburned magnesium oxide. Magnesium oxides, with the higher surface areas, are more active and provide shorter times for gelation and hardening. Thus, lightburned magnesium oxide, having a surface area of less than about 25 square meters per gram, is slow acting and generally will not be used when it is desired to have the binder composition cure in a relatively short period of time at temperatures below about 120° F. On the other hand, magnesia having a higher surface area, such as about 65 square meters per gram ($m^2/g$) and above, will harden the same binder composition in a shorter period of time. For many applications, using magnesia having a surface area of about 25 to 65 square meters per gram is suitable. Hardburned magnesia reacts too slowly as a hardener to be of practical value, and deadburned magnesia is sufficiently inert so that it is used conventionally as a refractory with phenolic resin binders with little or no effect on room temperature hardening rates.

The phenolic resole resins of this invention contain one or more volatile solvents, including water. Loss of solvent in the thermally cured compositions leads to increased porosity porosity and permeability to liquids and decrease of strength. One means for obtaining the higher strength and less porosity is to use a larger quantity of lightburned magnesium oxide hardener. However, this will further shorten the time of viscosity build up and gelation. It has now been found that lightburned magnesium oxide having at least two different surface areas can provide the improved results such as increased strength without substantially accelerating the viscosity build up. To attain such improved results, the lightburned magnesium oxide hardener comprises particles having at least two different surface areas with about 25 to 75% thereof by weight having a surface area of at least 50 square meters per gram and about 25 to 75% thereof, by weight, having a surface area of about 10 to 25 square meters per gram. Preferably, the magnesium oxide hardener for such improved results consists essentially of particles having at least 2 different surface areas as set forth in the previous sentence. By following this method of using different surface areas, the room or ambient temperature gelation can take place in about the same time as with the higher surface area hardener used alone, even though there is substantially more of the hardener present but the compressive strength of the composition on curing is substantially increased and the composition has less porosity and less permeability. Furthermore, the fire retardency of compositions having the increased quantity of the magnesia is also improved. Compositions containing the lightburned magnesia of different surface areas will optionally contain an accelerator of this invention, an ester functional hardening agent as well as fillers, modifiers, aggregate, and other additives at the same concentration as with lightburned magnesium oxide which does not contain a mixture of the hardener having different surface areas.

The quantity of lightburned magnesium oxide or magnesium hydroxide which is used in this invention as a hardener is an amount sufficient to increase the rate of gelation or hardening of the phenolic resole resin. This quantity can vary over a wide range. The quantity of the magnesium hardener used will vary depending on whether or not an ester hardening agent is also used in the composition, the surface area of the magnesium oxide, the specific ester hardening agent, the quantity of magnesium and ester hardening agent or agents, the temperature, and the desired result. Thus, the magnesium oxide or magnesium hydroxide hardening agent will generally vary from about 5% to 40% by weight of the resin in the various compositions and methods of this invention. However, when mixtures of lightburned magnesium oxide having different surface areas is used, the quantity of the magnesium oxide preferably varies from about 5% to 50% or more by weight of the resin.

When magnesium oxide or magnesium hydroxide hardener is used without the ester hardening agent, it is preferred that from about 10% to 40% by weight be used, based on the weight of the resin, and particularly 15% to 30% by weight based on the weight of resin. When the magnesium oxide or magnesium hydroxide is used together with an ester functional hardening agent, is is preferred that the quantity of magnesium oxide or magnesium hydroxide hardening agent vary from about 5% to 30% by weight of the resin, and particularly, from about 5% to 20%.

The Ester Hardening Agent

The ester functional hardening agent, also referred to as ester functional curing agent, accelerates the hardening of the resole when used with the magnesium hardeners while at the same time use of both magnesium hardening agent and ester hardening agent mixed with the resole resin provide a hardening system which is very sensitive to small quantities of the accelerators of this invention. Mixtures of phenolic resole resins and an ester functional hardening agent in the absence of magnesia, or other added alkali, will not harden at 70° F. within several days or longer. The ester functionality for hardening of the phenolic resole resin can be provided by lactones, cyclic organic carbonates, carboxylic acid esters, or mixtures thereof.

Generally, low molecular weight lactones are suitable as the ester functional hardening agent, such as beta or gamma-butyrolactone, gamma-valerolactone, caprolactone, beta-propiolactone, beta-butyrolactone, beta-isobutyrolactone; beta-isopentyllactone, gamma-isopentyllactone, and delta-pentyllactone. Examples of suitable cyclic organic carbonates include, but are not limited to: propylene carbonate; ethylene glycol carbonate; 1,2-butanediol carbonate; 1,3-butanediol carbonate; 1,2-pentanediol carbonate; and 1,3-pentanediol carbonate.

The carboxylic acid esters which can be used in this invention include phenolic esters and aliphatic esters.

The aliphatic esters are preferably those of short or medium chain length, e.g., about 1 to 10 carbon mono- or polyhydric, saturated or unsaturated alcohols with short or medium chain length, e.g., about 1 to 10 carbon aliphatic, saturated or unsaturated carboxylic acids which can be mono- or polycarboxylic. The preferred aliphatic esters are those of alkyl, mono-, di-, or trihydric alcohols with alkyl, or mono-, or diunsaturated acids which can be mono-, di-, or tricarboxylic. The carboxylic acids can be substituted with hydroxy, cyano, chloro, or bromo groups.

As to aromatic esters, such esters can be obtained by esterifying the aromatic, e.g., phenolic, group or groups of a mono- or polyhydric aromatic phenol to prepare a formate or acetate ester of such aromatic compound. Additionally, the aromatic ester can be an esterified phenolic compound containing one or more phenolic hydroxyl groups and/or one or more esterified phenolic hydroxyl groups and further containing one or more esterified methylol groups positioned ortho and/or para to a phenolic hydroxyl group or esterified phenolic hydroxyl group. Such phenolic esters and their method of manufacture are disclosed in U.S. Ser. No. 450,989 filed Dec. 15, 1989 entitled "Phenolic Resin Compositions" with P.H.R.B. Lemon et al as inventors which in turn in based on GB 8829984.7 filed Dec. 22, 1988 with the same inventors and both the U.S. and British cases are incorporated herein by reference.

It will be understood that the esterified phenolic compound used may be a mono-, a di- or a polyesterified methylolated mono-, di- or polynuclear phenol wherein at least one esterified methylol group is attached to an aromatic ring carbon atom ortho or para to a phenolic hydroxyl group or esterified phenolic hydroxyl group. The acid portion of the phenolic esters can be the same as those of the aliphatic esters.

Specific carboxylic acid esters include but are not limited to: n-butyl formate; ethylene glycol diformate; methyl and ethyl lactates; hydroxyethyl acrylate; hydroxyethyl methacrylate; n-butyl acetate; ethylene glycol diacetate; triacetin (glycerol triacetate); diethyl fumarate; dimethyl maleate; dimethyl glutarate; dimethyl adipate; 2-acetyloxymethyl phenol; 2-methacryloyloxymethyl phenol; 2-salicyloyloxymethyl phenol; 2-acetyloxymethyl phenol acetate; 2,6-diacetyloxymethyl p-cresol; 2,6-diacetyloxymethyl p-cresol acetate; 2,4,6-triacetyloxymethyl phenol; 2,4,6-triacetyloxymethyl phenol acetate; 2,6-diacetyloxymethyl phenol acetate; 2,2',6,6'-tetraacetyloxymethyl Bisphenol A; and 2,2',6,6'-tetraacetyloxymethyl Bisphenol A diacetate. Also suitable are: cyanoacetates derived from 1 to 5 carbon atom aliphatic alcohols; formates and acetates of benzyl alcohol, alpha,alpha-dihydroxyxylenols, phenol, alkyl substituted phenols, dihydroxybenzenes, bisphenol A, bisphenol F, and low molecular weight resoles. At times, it is advantageous to use mixtures of the ester functional hardening agents.

Gaseous esters, such as $C_1$ to $C_2$ alkyl formates, can be used as ester functional hardening agents in low density articles or when applying the binders to fabric or paper substrates. When gaseous esters are used as hardening agents, the ester is generally not mixed with the resin binder and aggregate but rather is supplied as a gas to the shaped article as is well known in the art.

The ester functional hardening agent is present in an amount sufficient to increase the tensile and compressive strength of the hardened composition. Such quantity also increases the rate of hardening of the phenolic resole resin in the presence of the magnesium hardener and will vary over a broad range such as that of about 5% to 40% by weight of the phenolic resole resin and preferably from about 10% to 25% by weight of the resin. As with said magnesium hardening agent, the exact quantity will depend on the particular ester hardener used, the amount and specific magnesium hardener used, the temperature at which the composition is used or stored, and desired results.

The Phenolic Resole Resin

A broad range of phenolic resole resins may be used in this invention. These can be phenol-formaldehyde resole resins or those wherein phenol is partially or completely substituted by one or more phenolic compounds such as cresol, resorcinol, 3,5-xylenol, bisphenol-A, or other substituted phenols and the aldehyde portion can be partially or wholly replaced by acetaldehyde, furaldehyde, or benzaldehyde. The preferred phenolic resole resin is the condensation product of phenol and formaldehyde. Resole resins are thermosetting, i.e., they form an infusible three-dimensional polymer upon application of heat and are produced by the reaction of a phenol and a molar excess of a phenol-reactive aldehyde typically in the presence of an alkali or alkaline earth metal compound as condensing catalyst.

Preferred phenolic resole resins used in this invention have less than about 1% and preferably not more than 0.5% by weight of water soluble sodium or potassium. Typically, the phenolic resole resin will be a phenol-formaldehyde resin produced by reacting phenol and formaldehyde in a molar ratio (phenol: formaldehyde) within the range of from about 1:1 to 1:3. A preferred molar ratio for use in this invention ranges from about one mole of the phenol for each 1.1 mole of the aldehyde to about 1 mole of phenol for 2.2 moles of the aldehyde and particularly a range of phenol to aldehyde of 1 to 1.2 to 1 to 2. The phenolic resole resin will usually be used in solution.

The pH of the phenolic resole resin used in this invention will generally vary from about 4.5 to 9.5 with a pH of about 5 to 9 and particularly about 5 to 8.5 being preferred. Free phenol will typically be 2% to about 25% by weight of the resin with preferred levels being 5% to about 12%. The molecular weight of the resin will vary from about 200 to 5000 weight average molecular weight with 300 to about 2000 being preferred. All other things being equal, higher molecular weights and lower free-phenol will provide shorter gel or hardening time and increase strength development. The weight average molecular weight (Mw) is measured using gel permeation chromatography and phenolic compounds and polystyrene standards. The sample molecular weight to be measured is prepared as follows: The resin sample is dissolved in tetrahydrofuran and slightly acidified with 1N hydrochloric or sulfuric acid and dried over anhydrous sodium sulfate. The salts which result are removed by filtration and the supernatent liquid run through a gel permeation chromatograph.

The resin solids in the resole resin can vary over a broad range, such as that of about 50% to 90% by weight of the phenolic resole resin. Preferably, the resin solids vary from about 50% to 80% by weight of the phenolic resole resin. The viscosity of the phenolic resole resin, or simply the resin, can vary over a broad range such as that of about 100 to 4,000 cps at 25° C. Preferably, the viscosity varies from about 200 to 3,000 cps at 25° C. and particularly from about 250 to 2,000 cps at 25° C. The viscosity measurements herein are given in centipoises (cps) as measured by a Brookfield RVF viscometer at 25° C. or by Gardner-Holt viscosities at 25° C. The Gardner-Holt viscosities which are in centistokes are multiplied by the specific gravity (generally 1.2) to give the cps at 25° C.

The quantity of resin based on aggregate, when aggregate is used for the raw batch compositions, can vary over a broad range, preferably from about 3% to 20% by weight of resin based on the weight of aggregate and particularly from about 5% to 15% of resin based on the weight of aggregate.

The liquid portion of the resin is water or water together with a non-reactive solvent. The resin can include a number of optional modifiers or additives such as silanes, hexa, or urea. Solvents in addition to water can be selected from alcohols of one to five carbon atoms, diacetone alcohol, glycols of 2 to 6 carbon atoms, mono-and dimethyl or butyl ethers of glycols, low molecular weight (200–600) polyethylene glycols and methyl ethers thereof, phenolics of 6 to 15 carbons, phenoxyethanol, aprotic solvents, e.g., N,N-dimethylformamide, N,N-dimethylacetamide, 2-pyrrolidinone, N-methyl-2-pyrrolidinone, dimethyl sulfoxide, tetramethylene sulfone, hexamethylphosphoramide, tetramethyl urea, methyl ethyl ketone, methyl isobutyl ketone, cyclic ethers such as tetrahydrofuran and m-dioxolane, and the like.

Typical water contents for the resins used in this invention will vary from about 5% to 20% by weight of the resin and can thus be referred to as aqueous solutions.

Organofunctional silane adhesion promoters are recommended for use when compositions of this invention include siliceous aggregates, such as silica sands, crushed rock and silicates, and alumina based aggregates.

The organofunctional silanes are used in a quantity sufficient to improve adhesion between the resin and aggregate. Typical usage levels of these silanes are 0.1 to 1.5% based on resin weight. Illustrative of silanes that are useful are those represented by the generic Formula I.

$(RO)_3-Si-CH_2-CH_2-CH_2-X$ where    Formula I:

$R = CH_3$, or $C_2H_5$

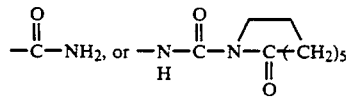

$X = Cl, -NHR^1, -O-CH_2-CH----CH_2$, or $-SH$ and $R^1 = H, CH_3, C_6H_5$ (phenyl), $-CH_2CH_2NH_2$, $-\overset{O}{\underset{\|}{C}}-NH_2$, or $-\underset{H}{N}-\overset{O}{\underset{\|}{C}}-N-\overset{}{\underset{\|}{C}}(CH_2)_5$
                                                     $\|$
                                                     $O$ Other useful silanes not represented by Formula I are 2-(3,4-epoxycyclohexyl)ethyl trimethoxysilane, bis(-trimethoxysilylpropyl)ethylenediamine, N-trimethoxysilylpropyl-N,N,N-trimethylammonium chloride and secondary amino silane $[(RO)_3Si-CH_2CH_2CH_2]_2NH$.

The Accelerators

A wide range of materials have been found to be accelerators. Accelerating the hardening of the phenolic resole resin provides for a shorter wait between the time the composition is mixed and when it is hard enough to use. Without the use of an accelerator, in many instances the phenolic resole resin, magnesium hardener and optionally ester functional hardening agents, with or without fillers or aggregates will harden within 24 hours at 75° F. so that on bending or flexing a sheet or bar of such composition, the sheet or bar will break.

In case of ionizable compounds, it is the anion, e.g., $Cl^-$, which determines whether a material is an accelerator. Thus the cation, e.g., $Na^+$, $H^+$, $Li^+$ does not change the anion from being an accelerator, although it can have some effect on the amount of gelation or hardening. Salts containing the following cations are particularly suitable in the accelerators of this invention: sodium; potassium; lithium; calcium; magnesium; ammonium; and lower alkyl substituted ammonium compounds such as those having from 1 to 4 carbon atoms in each alkyl group. The cations of the previous sentence as well as hydrogen, e.g., such as in nitric acid, are the preferred cations for accelerators of this invention. However, some compounds which do not appear to ionize are also accelerators.

The accelerators used in this invention have some solubility in the reaction medium. Such solubility can be different than that in water, particularly when the reaction medium contains substantial quantities of ester and less than about 15% water. For general purposes, however, the solubility in water of the accelerators is at least 0.1% and preferably at least 1.0% by weight at 25° C. except for the reactive organic bound chlorine or bromine containing accelerators which are often substantially insoluble in water. The accelerators can be in an acid form, e.g., hydrobromic acid, or in a salt form, as an acid addition salt of a basic nitrogenous compound or simply in a form which provides the accelerator anions when mixed with the phenolic magnesium hardener and optionally the ester. When the acid form is used in the presence of the magnesium hardeners, the salt of the acid is formed in situ, e.g., the magnesium salt when added to a phenolic resole resin and hardener composition of this invention, the acid or salt provides the appropriate anion.

The ionizable accelerators, e.g., those which provide chloride, sulfamate, etc. anions to the hardenable mixture appear to increase the solubility of magnesium or the quantity of soluble magnesium from the magnesium hardener in the hardenable mixture. This in turn accelerates the hardening of the phenolic. As stated hereinabove, the accelerator needs to have some solubility in the hardenable mixture. In this regard, the choice of the cation for combining with the anion of the ionizable accelerator needs to be made so that the anion is not rendered insoluble. This also applies with the use of other materials which may insolubilize some of the accelerator anions such as acid addition salts of amines of the various calcium containing compounds which can be used together with the magnesium hardeners for hardening the phenolic resole resins. To avoid insolubilization, the accelerator anion needs to be one which is not insolubilized by such materials or the hardenable mixture needs to contain a high quantity of the accelerator anion so that sufficient anions remain for solubilizing the magnesium hardener. Illustratively, when calcium is the cation of the accelerator compound or when calcium containing hardeners are used, the accelerator anion should be one which forms a water soluble calcium compound such as one having a water solubility of at least 1% by weight at 25° C.

In the case of compounds which dissociate in water or alcohols to provide anions, compounds providing the following anions are accelerators and appear to be effective by increasing the amount of magnesium in the aqueous solution of the magnesium hardener, phenolic resole resin, and other ingredients in the hardenable mixture: chloride, nitrate, sulfate, sulfite, bisulfite, bisulfate, sulfamate, phosphite, hypophosphite, cyanate, bromide, formate, and thiosulfate. Such accelerators increase the quantity of soluble magnesium in the hardenable mixture of phenolic, magnesium hardening agent and optionally ester hardening agent or other ingredients without addition of further magnesium oxide or magnesium hydroxide. The compound providing the anion accelerator can be in various forms such as the acid, salt, amine acid addition salt or reactive organic bound chlorine or bromine containing compounds. In the case of amine acid addition salts, such salts should have a water solubility of at least 1% by weight at 25° C. By reactive organic bound chlorine or bromine containing compounds, we mean materials which contain covalently bound chloride or bromide and which react by solvolysis or nucleophilic displacement with hydroxyl compounds such as water, alcohols, phenolic resins, or amines to liberate chloride or bromide ions, particularly in the presence of an alkaline material such as magnesium or calcium oxides or hydroxides.

Illustrative of compounds providing the accelerator in the acid form there can be mentioned: hydrochloric acid, phosphorous acid, hydrobromic acid, formic acid, hypophosphorous acid, sulfamic acid, and sulfuric acid.

Illustrative of salts for providing the anion accelerator, there can be mentioned: sodium chloride, potassium chloride, sodium bromide, lithium chloride, magnesium chloride, lithium carbonate, magnesium bromide, calcium chloride, ammonium sulfate, potassium bromide, potassium sulfamate, monosodium phosphite, choline formate, and the like.

Lithium carbonate is an accelerator which also improves the strength of the hardened resin composition, particularly after thermal cure. Lithium carbonate should be avoided when the composition contains water soluble calcium in a quantity greater than the quantity of lithium carbonate, due to possible decomposition of the carbonate by the water soluble calcium, e.g., such as in calcium oxide. Sulfamic acid and salts thereof are accelerators which also increase the strength of room temperature hardened phenolic resole resin compositions when the resin has at least about 10% of free phenol, e.g., 10 to 25% and relatively low molecular weight such as that of a weight average molecular weight (Mw) of about 150 to 500.

Illustrative of reactive organic bound chlorine or bromine containing accelerator compounds, there can be mentioned: cyanuric chloride (2,4,6-trichloro-s-triazine); 2,4-dichloro-6-n-propoxy-s-triazine; 2,4-dichloro-6-anilino-s-triazine; 2,4-dichloro-6-o-chloroanilino-s-triazine; methanesulfonyl chloride; α,α,α,-trichlorotoluene; and 2,3-dibromopropionitrile. Additional reactive organic bound chlorine or bromine containing compounds include: epichlorohydrin, epibromohydrin, 2,4-dichloro or dibromo-6-substituted s-triazines such as wherein the substituent is alkoxy or alkylamino of 1–6 carbons, aryloxy and arylamino of 6–10 carbons, and other heterocyclic polychlorides, e.g., 2,4-dichloropyrimidine; dichlorodiphenyl silane, silicon chlorides or bromides such as silicon tetrachloride, silicon tetrabromide, phenyl trichlorosilane, 1,3-dichloro-1,1,3,3-tetramethyl disiloxane; other carbon-chlorine or bromine compounds such as allyl, benzyl and cinnamyl chlorides, 1,4-dichloro-2-butene, methyl 2-chloroacetoacetate, 1,4-dibromo-2-butene, 2,3-dichloropropionaldehyde, 2,3-dichloropropionitrile, α,α¹-dibromoxylene, α,α¹-dichloroxylene, 2-chloromethyl-m-dioxolane, and acid chlorides, e.g., acetyl chloride, pivaloyl chloride, benzoyl chloride, isophthaloyl chloride, terephthaloyl chloride, and sulfur-chlorine compounds, e.g., benzene and toluene-sulfonyl chlorides, 1,3-benzene disulfonyl-chloride, and methanesulfonyl chloride. Additionally, compounds which liberate accelerator anions or compounds such as hydrogen chloride in water or alkanols such as dichlorophenylphosphine are operable.

Additionally, certain strong basic tertiary amines are accelerators. Illustrative of such accelerators, there can be mentioned 1,3,5-tri(lower alkyl) hexahydro-1,3,5-triazines wherein the lower alkyl has from 1 to 3 carbon atoms; 1,4-diazabicyclo[2.2.2.]octane which is commonly referred to as triethylene diamine; 2,2¹-bipyridine; 1,1,3,3-tetra lower alkyl of 1 to 3 carbon atoms guanidine; 2,4-di(lower alkylaminomethyl)phenol, 2,6-di(lower alkylaminomethyl)phenol, and 2,4,6-tris(di-lower alkylaminomethyl)phenol wherein each alkyl group has from 1 to 3 carbon atoms; and a compound of the formula:

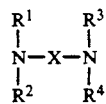

wherein:

(i) each of $R^1$ and $R^2$ is a member selected from the group consisting of alkyl having 1 to about 3 carbon atoms, and $R^1$ and $R^2$ when taken together with the nitrogen to which they are attached represent a member selected from the group consisting of piperidino, piperazino, morpholino, thiomorpholino, and pyrrolidino;

(ii) X is a member selected from the group consisting of $(-CH_2-)_n$ wherein n is an integer of 1 to 6, $-CH=CH-CH_2-$, $-CH_2-CH=CH-CH_2$, and

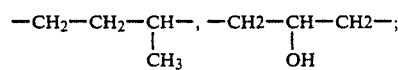

and (iii) each of $R^3$ and $R^4$ is a member selected from the group consisting of hydrogen, alkyl of 1 to about 3 carbon atoms, and $R^3$ and $R^4$ when taken together with the nitrogen to which they are attached represent a member selected from the group consisting of piperazino, morpholino, thiomorpholino, piperidino, and pyrrolidino. Acid addition salts of the above mentioned basic amino accelerators, wherein the acid includes one of the previously mentioned accelerator anions or another anion which is not a retarder, as well as lithium carbonate, provide beneficial accelerator compounds. Other anions which are not retarders include formate, trifluoroacetate, chloroacetate, benzoate, benzenesulfonate, and substituted benzoates and substituted benzenesulfonates wherein the substituent is alkyl of 1 to 4 carbon atoms, halo, or nitro.

Still another group of accelerators are certain chelating agents, such as: heptane-2,4-dione; pentane-2,4-dione, also referred to as acetylacetone; 2,2¹-bipyridine; benzoylacetone; 2-acetylcyclopentanone; and 2-formylcyclopentanone.

The quantity of accelerator used in this invention can vary over a wide range depending on the activity of the particular accelerator, the amount of acceleration desired, the room or ambient temperature, the surface area and quantity of the lightburned magnesium oxide, and the type and quantity of ester hardener. Thus, the quantity of accelerator sufficient for hastening the gelation and hardening of the phenolic resole resin can vary over a broad range such as that of from about 0.1% to 5% by weight based on the weight of the phenolic resole resin. Preferably, the quantity of accelerator is from about 0.5% to 5% and, particularly, from 1.0% to 5% by weight of the resin. Chlorides can be effective accelerators by use of as little as 0.1% by weight, based on the resin but higher quantities of the other accelerators are generally required.

Fillers, Aggregates, and Modifiers

The compositions of this invention can include fillers, modifiers, and aggregates which are conventionally used with phenolic resole resins. The aggregate material may be a particulate material such as that in granular, powder, or flake form. Suitable aggregate materials include but are not limited to: magnesite, alumina, zirconia, silica, zircon sand, olivine sand, silicon carbide, silicon nitride, boron nitride, bauxite, quartz, chromite, and corundum. For certain applications, low density aggregate materials such as vermiculite, perlite, and pumice are preferred. For other applications, preferable high density aggregates include: limestone, quartz, sand, gravel, crushed rock, broken brick, and air cooled blast furnace slag. Sand, gravel, and crushed rock are preferred aggregates in polymeric concrete. Fillers such as calcium carbonate, kaolin, mica, wollastonite, and barites can be used in quantities of up to about 50% by weight of the formulated resin product. The quantity of such fillers can equal the quantity of the resin. Hollow microspheres of glass, phenolic resin, or ceramic can also be used in quantities of up to about 20% of the formulated resin product. Other optional modifiers, particularly in polymer concrete, include fibers such as steel, alkali resistant glass, polyester, carbon, silicon carbide, asbestos, wollastonite fibers, and aromatic polyamides such as KELVAR ® aramid fiber which is sold by DuPont, and polypropylene. The quantity of such fibers can vary over a wide range sufficient to improve the strength of the composition, e.g., from about 2% to 5% by weight of aggregate when aggregate is used in the composition.

The raw batch compositions produced by combining the hardenable resin binder, aggregate, hardening agent or agents, and accelerator may additionally comprise any of a number of optional modifiers or additives including non-reactive solvents, silanes, hexamethylenetetraamine, clays, graphite, iron oxide, carbon pitch, silicon dioxide, metal powders such as aluminum, magnesium, silicon, surfactants, dispersants, air detraining agents, and mixtures thereof. Air detraining agents such as antifoamers, e.g., dimethylpolysiloxane and the like, can be employed in an amount sufficient to increase the strength of the composition. Such quantities can vary over a broad range such as from about 0.005% to 0.1% based on the weight of resin and preferably from about 0.01% to 0.05% based on the weight of resin. Illustrative of additional air detraining agents there can be mentioned: various acetylenic derivatives such as the SURFYNOLS of Air Products and Chemicals, Inc. such as SURFYNOL DF-110, SURFYNOL 104, and SURFYNOL GA; and various siloxanes such as dimethylpolysiloxane and dimethylsiloxane-alkylene oxide block copolymer such as PS073 which is supplied by Hüls Petrarch Systems.

In foundry applications and sand-binder overlays, or where silica sand is used as the aggregate, a preferred additive is a silane adhesion promoter, such as gamma-aminopropyl triethoxysilane. In refractory applications, clays, metal powders (e.g., aluminum, magnesium, or silicon), and graphite are preferred additives. When graphite or metal powders of aluminum, magnesium, or silicon or mixtures thereof are used as additives, the amount of aggregate, such as alumina or magnesia, can be reduced to as low as about 70% by weight of the composition.

Applications

The methods and compositions of this invention are particulary useful in: preparing shaped articles such as bonding refractory aggregate for the manufacture of bricks and castable monolithic shapes; coated abrasives; polymer concrete, also referred to as resin-filled aggregate, for repair or protective overlay for concrete to provide resistance to acids, oils, and organic solvents; manufacture of precast shapes such as pipe, tile, wall panel, and the like, where hydrolytic, solvent, acid, and heat resistance are desirable; and impregnated paper for use as auto oil and air filters.

Refractory shaped articles include refractory brick and monolithic refractories. The conventional refractory compositions contain: a hardenable phenolic resole resin; magnesium hardening agent; aggregate; and optionally ester functional hardening agent, metal powders and graphite. Aggregates normally used for refractories are: magnesia (periclase); alumina; zirconia; silica; silicon carbide; silicon nitride; boron nitride; bauxite; quartz; corundum; zircon sand; olivine sand; and mixtures thereof. Preferred aggregates for refractory use are refractory magnesia, also referred to as periclase, alumina, and silica. The amount of graphite generally varies from about 5% to 25% by weight of the refractory aggregate and the quantity of metal powder such as aluminum, magnesium, and silicon will generally vary from about 1% to 5% by weight of refractory aggregate. In the case of refractories such as brick, the refractory composition is pressed into the desired shape and thermally cured or, after pressing, the composition is allowed to harden at ambient temperature and then thermally cured.

In some refractory applications, prefabricated forms, other than brick-like shapes, are required. These "monolithic refractories" are cast by placing a liquid flowable binder-aggregate system into a mold and then filling out the mold by using vibration. Once the binder-aggregate system room temperature hardens, the mold is stripped away so that the shape can be thermally cured and readied for use, either before or after transporting the monolithic refractory to its place of use.

Hydraulic refractory calcium aluminate cements constitute the current binder technology for monolithic refractories. However, chemical interaction between molten metal such as iron, steel, and aluminum and hardened cements create problems such as dissolving, softening, or simply weakening hydrated cement phases which in turn increase permeability of the hardened refractory shape. This, in turn, severely limits the service life of the refractory shape. After room temperature hardening, the monolithic can be thermally cured or carbonized, preferably at the site of use such as part of a furnace lining. Carbonizing takes place at temperatures above 800° C. or 1,000° C.

Polymer concrete is formed by polymerizing a monomer, resin, or mixture thereof in the presence of an aggregate. Polymer concrete had its initial application in the repair of Portland Cement concrete. Today, they have many other uses as described herein above. The binder compositions of this invention are particularly advantageous for this use since the lack of high alkalinity and high sodium or potassium levels does not affect the aggregate and the composition can cure at room or ambient temperature in a reasonable time indoors or outdoors.

One use for the compositions of this invention is as coating or topping applied to a rigid surface such as concrete. Thus, a room temperature curable flooring composition is provided comprising a resin binder and aggregate system prepared as described above. Aggregates for the overlay coating can be selected from low or high density materials or mixtures thereof. The small amounts of sodium or potassium ions present in the preferred compositions of this invention from the preparation are not sufficient to produce adverse effects on concrete.

A preferred use for the compositions of this invention are for shaped articles wherein the article is cast and permitted to harden at room or ambient temperatures and is then thermally cured.

In order that those skilled in the art may more fully understand the invention presented herein, the following procedures and examples are set forth. All parts and percentages in the examples, as well as elsewhere in this specification and claims, are by weight and temperatures are in degrees Fahrenheit unless otherwise stated.

Procedure For The Preparation And Testing Of Polymer Concrete For Compressive Strength A 5-quart Hobart mixer was charged with
990.0 g Industrial Grade Sand No. 4 (Vulcan Materials Co.) This is also referred to herein as coarse sand.
360.0 g Industrial Grade Sand No. 10 (Vulcan Materials Co.) This is also referred to herein as medium particle size sand.
150.0 g Oklahoma Mill Creek Foundry Sand (U.S. Silica) This is also referred to herein as fine sand.
and 22.5 g MAGCHEM 50 (65 square meters per gram) a lightburned magnesia from Martin Marietta Magnesia Specialties.

180.0 g of Resin A containing 1.8 g silane, namely 3-glycidoxypropyl trimethoxysilane, was added. The resin-aggregate was mixed for a total of 2 minutes (at medium setting for 1 minute and high setting for 1 minute) then 45.0 g of γ-butyrolactone and 15.0 g water were added and mixing continued for 1 minute at medium setting and an additional 1 minute at a high setting. The mixture was then transferred to a mold containing 15 cylindrical cavities of 1½" depth and 1½" diameter. Each cavity was lined with thin polyester film to ease removal of hardened specimens. The charged mold was then vibrated for 2 minutes at a setting of 5.1 using a Syntron Vibrating Table. Surfaces were lightly troweled and the molds then transferred to a constant temperature (72° F.+/−2° F.) and humidity (51%+/−2%) room. Hardened specimens were removed from the mold after 24 hours and either tested or stored for evaluation at a later data. Compressive strengths for polymer concrete were determined on a Tinius Olsen tensile test machine at a slow speed of 0.15 inches/minute. Pounds to failure divided by 1.77 represents compressive strength in psi.

Procedure For The Preparation And Testing Of Polymer Concrete For Tensile Strength A 5 quart Hobart mixer charged with 891.0 g Industrial Grade Sand No. 4, 324.0 g Industrial Grade Sand No. 10, both from Vulcan Materials Co., 135.0 g Oklahoma Mill Creek Foundry Sand (U.S. Silica), and 13.5 g MAGCHEM 50, a lightburned magnesium oxide, (Martin Marietta Magnesia Specialties). To this mixture, was added 162.0 g of Resin A containing 1.62 g (grams) silane namely 3-glycidoxypropyltrimethoxy silane. The resin/aggregate mixture was mixed 2 minutes, one at medium speed and one at high speed. This mixture was then transferred to aluminum forms (presprayed with release agent) and cast to form dogbone specimens 3 inches long, 1 inch thick and 1 inch wide at the neck. The sprayed forms had been previously placed on polyester film atop an aluminum tray. Dogbone molds were filled and vibrated for 2 minutes at a setting of 5.1 on a Syntron Vibrating Table. The surfaces were lightly troweled and then the assembly transferred to a constant temperature (72° F.+/−2° F.) and humidity (51%+/−2%) room and allowed to harden. After 24 hours, samples were removed from molds and either tested or stored for evaluation at a later date. Tensile strengths were determined on a Tinius Olsen tensile test machine at a slow speed of 0.15 inches/minutes. Readings in psi are indicated on digital readout.

Determination of Soluble Magnesium From Reaction of Resin A & Magnesia Hardener with/without Ester Hardener and with/without Additive A glass screw cap vial (28×95 mm) was charged with
6.0 g Resin A
0.5 g water
1.5 g γ-butyrolactone (or 2-methoxyethyl ether, as indicated in the Examples or Tables herein),
which was briefly mixed to homogenize the solution whereupon 0.75 g lightburned magnesia (MAGCHEM 50; Martin Marietta Magnesia Specialties) was added. The mixture was thoroughly mixed for 1 minute using a S/P Vortex Mixer (American Scientific Products) at a setting of 9. 1.5 g of the uniform dispersion was immediately transferred to a vial containing 4.5 g N,N-dimethylformamide (DMF) and 0.5 g methanol. After mixing well for 1 minute, the contents were transferred to a centrifuge tube which was centrifuged for 5 minutes. The relatively clear liquor was filtered through a teflon microfilter. A weighed amount of clear solution was ashed in a platinum dish which was heated at 600° C. in a muffle furnace. The residue was treated with aqueous hydrochloric acid, diluted appropriately, and analyzed for magnesium by atomic absorption.

The above freshly mixed solution/magnesia dispersion (1.5 g per vial) was transferred to other empty vials which were placed in a 25° C. water bath. At appropriate times, 4.5 g DMF was added and, after 2 to 3 minutes of mixing, complete dispersion of resin was achieved. Then 0.5 g methanol was added, remixed, and then centrifuged and analyzed as described above. % Magnesium in original sample=% magnesium found×4.27 factored to correct for solvent dilution.

Flow Determination of Resin/Hardener/Magnesia/Aggregate Mix

A dome shaped 150 ml glass bowl 3" wide and 2" deep is lightly sprayed with release agent and charged, in 3 portions, with composite mix derived from resole, ester hardener, lightburned magnesia hardener, and aggregate (silica sands or refractory dead burned magnesias). The composite mix is gently tapped in place with a pestle after each addition. The bowl and contents are inverted onto polyester film taped to a Syntron Vibrating Table. The table is then vibrated for 20 seconds at a setting of 8 (3/4 of maximum setting). The diameter (in inches) of the resulting hemisphere is measured and % flow calculated by:

$$\frac{(\text{Diameter measured} - 3.0) \times 100}{3.0}$$

Procedure For Gel Determination

A screw cap glass vial (28×95 mm) is charged with: 6.0 grams Resin A or Resin B (as indicated in the Tables or Examples); additives if any, as indicated in Tables or Examples; 0.5 grams water; and 1.5 grams (g.) gamma butyrolactone. The solution is mixed well prior to addition of 0.75 g of lightburned magnesia having a surface area of 65 square meters per gram. The mixture is thoroughly mixed for one minute using a S/P Vortex Mixer of American Scientific Products at a setting of 9. Five grams (g) of this mixture is immediately transferred to a glass test tube (18×155 mm). A glass rod with a magnetized head fitting is introduced into the mixture and fitted to a Sunshine Gel Time Meter which is then turned on. The tube is immersed in a 25° C. water bath throughout the test.

Determination of gel times with Resin C used 5.0 g of mixture derived from 8.0 g of Resin C, 1.2 g gamma-butyrolactone and 1.6 g of the lightburned magnesia having a surface area of 65 square meters per gram. Solvents were optional. Gel determinations were run at 25° C. or at 60° C. (boiling chloroform).

100° C. gel times with Resin D used 5.0 g of a mixture derived from 8.4 g Resin D, 0.0081 ester equivalents of organic hardener, 2-methoxyethyl ether and 0.16 g of lightburned magnesia having a surface area of 25 square meters per g. The weight sum of ester hardener and 2-methoxyethyl ether was kept constant.

Gel times with resin E used 3.85 g resin and 1.16 g of ethyl lactate or 4.0 g Resin E and 1.0 g Triacetin.

Phenolic Resole Properties

Phenolic Resole Resin E is a commercial product sold as Alphaset 9,000 by Borden Chemical Company. Resin E is not a resin used in this invention except for comparison purposes. This resin has approximately 50% solids, 50% water, a viscosity of 150 cps at 25° C., and a pH of 13.

Phenolic Resole Resin A, or simply Resin A, is a phenol formaldehyde resole resin prepared by reacting phenol (P) with 50% formaldehyde (F) at a F/P molar ratio of 1.25 using sodium hydroxide as catalyst and then further formulated. This resin intermediate is formulated with acetic acid, ethanol, methanol, and N,N-dimethylformamide (DMF) to provide Resin A which has: a Gardner-Holt viscosity at 25° C., of 2,560 Centistokes, or approximately 3,000 cps at 25° C.; 68% solids; 7% free phenol; 10% lower alkyl alcohols; 12% water; 4% DMF; a pH of 5.9, and a weight average molecular weight of 4,000.

Phenolic Resole Resin B, or simply Resin B, is a more alkaline, water dilutable analog of Resin A without the acetic acid, and N,N-dimethylformamide (DMF), but instead formulated with ethanol to provide a 7.5% ethanol content and potassium hydroxide 0.75% based on Resin B to provide a pH of 8.9 to the final resin solution as well as a weight average molecular weight of 4,000 and 67% solids, 18% water, and 7% free phenol, all based on the weight of resin (B.O.R.).

Phenolic Resole Resin C, or simply Resin C, is prepared by reacting phenol (P) with 50% formaldehyde (F) at a F/P molar ratio of 1.25 using sodium hydroxide catalyst. This resin has a viscosity of 250 cps at 25° C.; 68.6% solids B.O.R.; 15.7% free phenol B.O.R.; 11.7% water B.O.R.; a pH of 8.9 and a weight average molecular weight of 290.

Phenolic Resole Resin D, or simply Resin D, is prepared by reacting phenol (P) with 50% formaldehyde (F) at a F/P molar ratio of 2.0 using potassium hydroxide catalyst. This resulting intermediate resin has a weight average molecular weight of 390 and is formulated with phenol and Dowanol DPnB (dipropylene glycol monobutyl ether-Dow Chemical) to give the final resin having: solids of 78%; free phenol of 16%; water of 8%; Dowanol DPnB of 8%; potassium of 1.3%; a pH of 9.2; and a viscosity at 25° C. of 3450 cps.

EXAMPLE 1

In this example, various additives were tested at 2%, based on resin weight (B.O.R.), unless indicated otherwise, for their effect on the rate of hardening of the phenolic resole resin in the presence of both magnesium hardener and ester hardener at about 25° C. The rate of hardening was determined by measuring time of gelation in accordance with the hereinabove procedure entitled "Procedure For Gel Determination." The resin employed was Resin A, the ester was γ-butyrolactone, and the magnesium hardener was Magchem 50. The control for Table 1 was the composition without additive which gave a gel time of 48 minutes. Also, for a lower molecular weight analog of Resin A, which is indicated on Table 1 with the superscript "(a)", the composition without additive gave a gel time of 67 minutes. Thus, gel times of less than 48 minutes, wherein the time is not followed by the superscript "(a)," of the various additives denote accelerators whereas get times of more than 48 minutes, wherein the time is not followed by the superscript "(a)," denote retarders. The results of this example are shown in Table 1. Some of the more significant results shown in Table 1 are as follows.

The chlorides are the most effective accelerators. Organic chlorine or bromine containing materials that react with water or alcohols at about 25 degrees C. at pH of about 5 to 9 to liberate chlorite or bromide ions act as reactive accelerators. Fluoride and bifluoride salts are retarders. Phosphoric acid and salts thereof are effective retarders. Surprisingly, related materials such as phosphorous acid, sodium phosphite, and hypophosphorous acid are accelerators.

TABLE 1

Effect of Additives on Gel Time of Resin A / γ-Butyrolactone/Magnesia Hardener

System: 6.0 g Resin A  1.5 g γ-Butyrolactone
0.5 g water  0.75 Lightburned Magnesia having surface area of 65 square meters per gram (65 m$^2$/g)

| Mix | Additive (2% on Resin) (Unless otherwise indicated) | Gel Time Min.(25° C.) |
|---|---|---|
| | Inorganic | |
| 1 | None | 48 67[a] 62[a][b] |
| 2 | Ammonium Bifluoride (0.5% B.O.R.) | 148 241[a][b] |
| 3 | Ammonium Chloride | 7 |
| 4 | Ammonium chloride (0.33% B.O.R.) | 28 |
| 5 | Ammonium Fluoride | 128 |
| 6 | Ammonium Nitrate | 33 |
| 7 | Ammonium Phosphate Monobasic | 85 |
| 8 | Ammonium Sulfate | 23 |
| 9 | Ammonium Sulfite | 32 |
| 10 | Calcium Chloride | 19 |
| 11 | Calcium Formate | 45 |
| 12 | Choline Chloride | 25 |
| 13 | Choline Formate | 37 |
| 14 | Hypophosphorous acid | 40[a] |
| 15 | Lithium Carbonate | 36 |
| 16 | Lithium Fluoride | 61 |
| 17 | Lithium Nitrate | 17 |

TABLE 1-continued

Effect of Additives on Gel Time of Resin A / γ-Butyrolactone/Magnesia Hardener

| | | |
|---|---|---|
| 18 | Lithium Sulfate | 34 |
| 19 | Magnesium Chloride | 6 |
| 20 | Magnesium Oxalate | 56 |
| 21 | Magnesium Sulfate | 44 |
| 22 | Meta phosphoric acid/mono sodium metaphosphate, 1:2 | 74 |
| 23 | Phosphoric acid | 107 |
| 24 | Phosphorous Acid | 19 |
| 25 | Potassium Cyanate | 37 |
| 26 | Potassium Fluoride | 126 |
| 27 | Potassium Iodide | 39 |
| 28 | Potassium Sulfamate | 16 |
| 29 | Sodium Bromide | 30 |
| 30 | Sodium Carbonate | 55 |
| 31 | Sodium Chloride | 12 |
| 32 | Sodium Bisulfate | 36 |
| 33 | Sodium Bisulfite | 26 |
| 34 | Sodium Dithionite | 42 |
| 35 | Sodium Fluoride | 174 |
| 36 | Sodium Hydroxide (1.4% B.O.R.) | 40 |
| 37 | Sodium Nitrate | 29 |
| 38 | Sodium Nitrite | 46 |
| 39 | Sodium Phosphate, Monobasic | 90 |
| 40 | Sodium Phosphate, Tribasic | 77 |
| 41 | Sodium Phosphite, Monobasic | 31 |
| 42 | Sodium Silicate | 47 |
| 43 | Sodium Sulfate | 22 |
| 44 | Sodium Thiosulfate | 20 |
| | Organic | |
| 1 | Acetic acid | 45 |
| 2 | Acetoguanamine (2,4-diamino-6-methyl-s-triazine) | 60 |
| 3 | Acetylacetone (pentane-2,4-dione at 3% B.O.R.) | 39[a] |
| 4 | Aminoacetic acid (glycine) | 65 |
| 5 | Aminoacetic acid (glycine) | 65 |
| 6 | p-Aminobenzoic acid | 108[a] |
| 7 | 3-Aminopropionic acid (βB-alanine) | 66 |
| 8 | Aminotri(methylenephosphonic acid) | 68 |
| 9 | Aspartic Acid | 104 |
| 10 | Benzoguanamine (2,4-diamino-6-phenyl-s-triazine) | 49 |
| 11 | 2,3-Butanedione (Biacetyl) | 75[a] |
| 12 | Chloroacetamide | 52 |
| 13 | Citric Acid | 193 |
| 14 | 2,3-Dibromopropionitrile | 40 |
| 15 | 2,4-Dichloro-6-n-propoxy-s-triazine | 22 |
| 16 | 2,4-Dichloro-6-o-chloroanilino-2-triazine | 26 |
| 17 | Dichlorodiphenyl silane | 24 |
| 18 | α,α-Dichlorotoluene | 46 |
| 19 | Diethyl phosphite | 51 |
| 20 | o,p-Dimethylaminomethyl phenois DMP-10 of Rohm & HAAS Co. | 59[a] |
| 21 | EDTA | 73 |
| 22 | Guanidine Hydrochloride | 24 |
| 23 | Glutamic Acid | 76 |
| 24 | Glycolic Acid | 47 |
| 25 | Hexachlorocyclopentadiene | 49 |
| 26 | Hexamethylenetetraamine | 44 |
| 27 | 1-Hydroxyethylidene-1,1-diphosphonic acid | 63 |
| 28 | Imidazole | 56 |
| 29 | Iminodiacetic acid | 103 |
| 30 | Malic Acid | 118 |
| 31 | Malonic Acid | 55 |
| 32 | Melamine | 66 |
| 33 | Methanesulfonyl Chloride | 22 |
| 34 | Methyl 2,3-dichloropropionate | 43 |
| 35 | N-methyl imidazole | 48 |
| 36 | Oxalic Acid | 86 |
| 37 | Phenyltriethoxy silane | 57 |
| 38 | Succinic acid | 41 |
| 39 | Tartaric Acid | 140 |
| 40 | Terephthalic acid | 56 |
| 41 | Tetraethoxy Silane | >276 |
| 42 | Tetraethoxy Silane (4% B.O.R.) | 327 |
| 43 | Tetraethoxy Silane (0.5% B.O.R.) | 92 |
| 44 | Tetraethoxy Silane (40% hydrolyzed at 0.5% concentration B.O.R. (Silbond 40 of Akzo Chem., Inc.) | 90 |
| 45 | Tetra n-butylammonium chloride | 38 |
| 46 | N,N,N¹,N¹-tetramethyl-1,3-propane diamine | 40[a] |
| 47 | Alpha, Alpha, Alpha-trichlorotoluene | 35 |
| 48 | Triethylene diamine, i.e., 1,4-diazabicyclo[2.2.2] octane | 39 |
| 49 | Alpha, Alpha, Alpha-trifluorotoluene | 49 |
| 50 | Trimethyl Borate | 46 |
| 51 | Trimethyl Phosphite | 53 |
| 52 | 2,4,6-Tris(dimethylaminomethyl) phenol | 35 |

[a]Resin having a weight average molecular weight of about 3,000 whereas the resin for the other determinations had a weight average molecular weight of about 4,000.
[b]0.75 g lightburned magnesium oxide having a surface area of 10 m²/g used in addition to 0.75 g lightburned magnesium oxide having a surface area of 65 m²/g.

EXAMPLES 2 AND 3

In these examples, tests were run to determine the effect of lightburned magnesia or magnesium hydroxide, esters, and additives on the compressive strength of polymer concrete. These examples were run in accordance with the Procedure For The Preparation and Testing of Polymer Concrete set forth hereinbefore.

For the polymer concrete data shown in Table 2 and 3, the compressive strengths were determined, unless specified otherwise, on room temperature (R.T.) cured specimens using Resin A, γ-butyrolactone as ester, lightburned magnesia or magnesium hydroxide as the alkali, and mixture of silica sands as aggregate.

It can be seen in Table 2 and Table 3 that:

(a) Fluoride retarder lowers R.T. strength after 24 hours, but this relative effect is more dramatic after 8 hours when compared to control. Lithium carbonate and calcium formate increase 1 day R.T. strength, but lithium fluoride (very low solubility) has no effect.

(b) Replacement of magnesia by a chemical equivalent of magnesium hydroxide leads to a dramatic decrease in compressive strength. However, magnesium hydroxide responds to accelerative and retardative effects. Chloride increases 24-hour R.T. compressive strength whereas fluoride decreases strength.

(c) Replacement of γ-butyrolactone ester by an equal weight of inert high boiling solvent (a glycol diether) leads to a dramatic reduction in 3 and 7 day R.T. strength. Four day immersion in 10% acetic acid, after a 3 day dry R.T. cure, leads to a strength decrease relative to a 7-day dry R.T. cure. With butyrolactone, an increase in strength is seen after the acetic acid treatment.

(d) Four day hot (90° C.) water immersion preceded by 3 day dry R.T. cure of concretes prepared using γ-butyrolactone and lightburned magnesia leads to significantly higher strength than systems where inert solvent replaces ester or where magnesium hydroxide replaces magnesia.

(e) Sulfamates which are good accelerators show a negative effect on strength (8 or 24 hours) with Resin A. However, sulfamates show improved strength with low molecular weight resins and high free phenol contents, e.g., 10% to about 25% of free phenol based on the weight of resin, as can be seen in Example and Table 10 herein. Moderate accelerator Li₂CO₃ shows a 24% strength increase after 24 hours.

TABLE 2

Polymer Concrete Using Resin "A"
Effect of Alkali and Ester

Mix: 36 g. Resin per 300 g. sand mixture
Diglyme or γ-Butyrolactone (25% B.O.R.)
Water (8.3% on resin)
Alkali source (magnesia or magnesium hydroxide hardener)
Epoxy Silane, 3-glycidoxypropyltrimethoxy silane, (1% on resin)

Compressive Strength, psi (Average of 3)

| Mix | 3 Days R.T. Dry | 7 Days R.T. Dry | H2O/ R.T. | H2O/ 90° C. | 3 Days R.T. Dry + 4 Days Wet Immersion 10% Acetic Acid R.T. |
|---|---|---|---|---|---|
| 1. Diglyme$^{(a)}$ (25% on resin) Lightburned Magnesia of 65 m$^2$/g (12.5% on resin) | 437 | 777 | 669 | 3423 | 611 |
| 2. γ-Butyrolactone (25% on resin) Lightburned Magnesia of 65 m$^2$/g (12.5% on resin) | 2962 | 3704 | 3546 | 4893 | 3934 |
| 3. γ-Butyrolactone (25% on resin) Magnesium Hydroxide (18% on resin)$^{(b)}$ | 587 | 1628 | 1601 | 3245 | 1628 |

$^{(a)}$Diglyme = (2-methoxyethyl)ether, inert solvent
$^{(b)}$Equivalent to 12.5% Lightburned Magnesia Oxide Effect of Additives on Compressive Strength Using
γ-Butyrolactone (Ester) With Magnesium Hydroxide as
Alkali Hardener

| Additive (% on Resin) | 24 Hr. R.T. Comp. Str. psi (average of 3) |
|---|---|
| None | 167 |
| NH4Cl (2% B.O.R.) | 214 |
| NH4F (2% B.O.R.) | 47 |

TABLE 3

Polymer Concrete Using Resin A - Effect of Additives on
Compressive Strength

Mix: Resin A (36 g per 300 g sands)
γ-Butyrolactone (25% B.O.R.)
Magchem 50 (12.5% B.O.R.) (MgO)
Water (8.3% B.O.R.)
Epoxy silane, namely, 3-glycidoxy-
propyl-trimethoxy silane (1% B.O.R.)

Aggregate:
Mixture of 3 sands:
198 g coarse
72 g medium
30 g fine

Room Temp. Comp. Str.. psi (average of 3)

| Additive (% on resin) | 8 Hrs. Hardening | 24 Hrs. Hardening |
|---|---|---|
| None (control) | 477 | |
| NaF (at 2% B.O.R.) | 168 | |
| Sodium Sulfamate (at 2% on Resin) | 393 | |
| Control | | 1390 |
| NaF (at 2% B.O.R.) | | 1103 |
| Sodium Sulfamate (at 1% B.O.R.) | | 1110 |
| Control | | 1353 |
| Li2CO3 (at 2% B.O.R.) | | 1781 |
| LiF (at 2% B.O.R.) | | 1315 |
| Calcium Formate (at 2% B.O.R.) | | 1520 |

In addition to the above Table 3, deadburned pulverized periclase was used by substituting about 18% of the periclase in place of the 12.5% MAGCHEM 50 magnesium oxide in the mix of Table 3. Without a retarder, the mix with periclase showed a 24-hour compressive strength, psi of 105, and with a 2% addition of ammonium fluoride, the mix remained soft after 5 days at room temperature. The periclase was 98.1% MgO on an ignited basis with a bulk specific gravity of 3.28 having 95% passing through a 50 U.S. Sieve Series screen and 75% passing a 200 U.S. Sieve Series screen.

EXAMPLE 4

In this example, tests were run to determine the effect of surface area of the lightburned magnesia hardener on gel time. The compositions tested were 6.0 g (grams) Resin A; 0.5 g water; 1.5 g of γ-butyrolactone and 0.75 g of magnesia hardener of different surface areas. The results are shown in Table 4. It can be seen from Table 4 that gel time is a function of magnesia surface area and concentration with the higher surface areas or concentrations decreasing the gel time.

TABLE 4

Effect of Magnesia on Gel Time of Resole-Ester-Magnesia Hardener

System: 6.0 g Resin A   1.5 g γ-Butyrolactone
0.5 g water   0.75 g (grams) Lightburned Magnesia (MgO)

| Mix | Surface Area of MgO.m$^2$/g (square meters per gram) | Gel Time, Min. at 25° C. |
|---|---|---|
| 1 | 100 | 26 |
| 2 | 65 | 50 |
| 3$^{(a)}$ | 65 | 99 |
| 4 | 25 | 119 |

$^{(a)}$½ quantity of MgO used.

EXAMPLE 5

This example was performed to show the effect of additives which were previously shown to be accelerators or retarders at the 25° C. room temperature (R.T.) hardening on the solubilization of magnesium in the reaction mixture. The example was run in accordance with the "Procedure For Determination of Soluble Magnesium From Reaction Of Resin A & Magnesia Hardener With/Without Ester Hardener And With-/Without Additive" which is set forth hereinabove. The results are shown in Table 5. The percentage readings of B.O.R. following the additive are percentages of the additive based on resin weight (B.O.R.). It can be seen from Table 5 that chloride increases magnesium solubilization and fluoride decreases solubilization in the reaction mixture. A similar effect is seen without ester in mixes 4–6 wherein the ester is replaced by inert solvent 2-methoxyethyl ether. The chelating agent, pentane-2,4-dione also increase magnesium solubilization.

TABLE 5

Effect of Additives on Solubilization of Magnesium

| System: | | |
|---|---|---|
| | Resin A | 6.0 g |
| | γ-Butyrolactone (or inert solvent) | 1.5 g |
| | Water | 0.5 g |
| | Lightburned Magnesia (65 m$^2$/g) | 0.75 g |
| | | % Soluble Magnesium |

TABLE 5-continued
Effect of Additives on Solubilization of Magnesium

| Mix[a] | Additive (% on Resin) | Reaction Time, Min. | | |
|---|---|---|---|---|
| | | 1 | 12 | 60 |
| 1 | None | 0.48 | 0.80 | 1.60 (50 min) |
| 2 | Sodium chloride (2% B.O.R.) | 0.53 | 0.97 | — |
| 3 | Ammonium fluoride (0.17% B.O.R.) | 0.26 | 0.53 | 0.69 |
| 4 | None | 0.43 | 0.76 | — |
| 5 | Sodium chloride (2% B.O.R.) | 0.52 | 0.91 | — |
| 6 | Ammonium fluoride (0.17% B.O.R.) | 0.20 | 0.34 | — |
| 7[b] | None | 0.0015 | — | — |
| 8 | Citric Acid (2% B.O.R.) | 0.16 | 0.31 | |
| 9 | Tetraethoxy Silane (2% B.O.R.) | 0.47 | 0.72 | |
| 10[c] | Tetraethoxy Silane (2% B.O.R.) | 0.43 | 0.69 | |
| 11[d] | Silbond 40 | 0.54 | 0.90 | 1.25 (after 15 min.) |
| 12 | N,N,N¹,N¹-Tetramethyl-1,3-propane-diamine (2% B.O.R.) | 0.64 | 1.05 | |
| 13 | Pentane-2,4-dione (2% B.O.R.) | 0.73 | 1.09 | 1.67 |

[a]Mixes 1–3, 7–13 use γ-butyrolactone
Mixes 4–6 use inert solvent 2-methoxyethyl ether
[b]No resin is present; but proportionate amounts of water, alcohols, D.M.F. in resin are present.
[c]Delayed addition of ester and magnesia by five minutes.
[d]Delayed additon of ester and magnesia by 30 minutes.

EXAMPLE 6

In this example, a number of di- and tri-amino compounds were tested as accelerators, including acyclic and cyclic compounds. The results of this example are shown in Table 6. Mix No. 8 shows the additive accelerating effect of TRIS and a chloride.

EXAMPLE 7

Tests were performed to show the effect on gel time of various additives with certain esters. The gel time tests were run in accordance with the procedure set forth hereinbefore entitled "Procedure For Gel Determination." The test results set forth in Table 7 show accelerator or retarder activity of various additives at different temperatures and with different esters and resins.

TABLE 6
Effect of Solvent & Amine on Gel Time of Resin C/γ-Butyrolactone/Magnesia Mix: 8.0 g Resin C
1.33 g solvent
1.2 g γ-butyrolactone
1.6 g magnesia (surface area of 65 m²/g)

| Mix | Solvent | Amine (2% on resin) | Gel Time Min. (25° C.) |
|---|---|---|---|
| 1 | H₂O | — | 210 |
| 2 | 1:1 H₂O/dipropylene glycol n-monobutyl ether (DP$_n$B) | — | 315 |
| 3 | 1:1 H₂O/DP$_n$B | TRIS {2,4,6-tris(dimethyl-aminomethyl) phenol} | 205 |
| 4 | 1:1 H₂O/DP$_n$B | 1,1,3,3-tetramethyl-quanidine | 277 |
| 5 | 1:1 H₂O/DP$_n$B | N,N,N¹,N¹tetramethyl-ethylene diamine | 194 |
| 6 | 1:1 H₂O/DP$_n$B | N,N,N¹,N¹-tetramethyl-1,3-propanediamine | 174 |
| 7 | 1:1 H₂O/DP$_n$B | 1,3,5-triethyl hexahydro-1,3,5-s-triazine | 213 |
| 8 | 1:1 H₂O/DP$_n$B | TRIS + 0.5% HCl, which corresponds to TRIS dihydrochloride | 168 |
| 9 | 1:1 H₂O/DP$_n$B | 0.5% HCl | 244 |
| 10 | 1:1 H₂O/tetramethylene-sulfone | TRIS | 217 |
| 11 | 1:1 H₂O/polyethylene glycol (mol. wgt. 300) | TRIS | 195 |
| 12 | 1:1 H₂O/polyethylene glycol mono-methyl ether (mol. wgt. 350) | TRIS | 185 |
| 13 | 1:1 H₂O/polyethylene glycol mono-methyl ether (mol. wgt. 350) | — | 275 |
| 14 | 1:1 H₂O/DP$_n$B | N,N,N¹,N¹-tetramethyl diaminomethane | 106 |
| 15 | 1:1 H₂O/DP$_n$B | N,N-diethylethylenediamine | 189 (164)* |
| 16 | 1:1 H₂O/DP$_n$B | N,N-dimethyl-1,3-propanediamine | 185 |
| 17 | 1:1 H₂O/DP$_n$B | N,N-dipiperidinylmethane | 164 |
| 18 | 1:1 H₂O/DP$_n$B | N-(3-aminopropyl)morpholine | 159 |
| 19 | 1:1 H₂O/DP$_n$B | 4-amino-2,6-dimethylpyrimidine | 251 |
| 20 | 1:1 H₂O/DP$_n$B | 2,2¹-bipyridine | 206 |

*Prereacted amine with resin prior to addition of ester and MgO.

TABLE 7

Effect of Additives on Gel Time of Resole-Ester-Magnesia Hardener

| Mix[a] | Resin | Ester | Additive (2% on Undiluted Resin) | Temp °C. | Gel Time, Minutes |
|---|---|---|---|---|---|
| 1 | A | γ-Butyrolactone | None | 60 | 7 |
| 2 | A | γ-Butyrolactone | Sodium fluoride | 60 | 21 |
| 3 | A | γ-Butyrolactone | Monosodium phosphate | 60 | 13 |
| 4 | A | Methyl lactate | None | 25 | 92 |
| 5 | A | Methyl lactate | Ammonium chloride | 25 | 22 |
| 6 | B | γ-Butyrolactone | None | 25 | 48 |
| 7 | B | γ-Butyrolactone | Ammonium chloride | 25 | 19 |
| 8 | B | γ-Butyrolactone | Ammonium fluoride | 25 | 267 |
| 9 | B | γ-Butyrolactone | None | 25 | 52 |
| 10 | B | γ-Butyrolactone | Sodium sulfate | 25 | 12 |
| 11 | A | Propylene carbonate | None | 25 | 23 |
| 12 | A | Dimethyl succinate | None | 25 | 71 |
| 13 | A | Dimethyl succinate | Lithium chloride | 25 | 13 |

[a] 6.0 g resin, 0.5 g water 1.5 γ-butyrolactone, 0.75 g lightburned magnesia (65 m²/g surface area) for Mixes 1-3, 6-8. Additional 1.8 g water for Mixes 9-10 in relation to Mix 1. Replace γ-butyrolactone by 1.75 g methyl lactate for mixes 4-5 in relation to Mix 1. In mixes 11-13, used the indicated ester in place of γ-butyrolactone in relation to Mix 1.

EXAMPLE 8

This example was performed to determine the effect of magnesia/lime ratios and additives on gel times of a resole and ester. The results of this example are shown in Table 7. It can be seen that in Resin A, up to 33% of MgO hardener can be replaced by CaO with substantially no effect on gel time (mixes 1-4) but a problem results at a 1:1 ratio (mix 5). In contrast, Resin C (lower molecular weight and higher free phenol) cannot tolerate even a 20% replacement of MgO with CaO without significantly adversely affecting gel time (Mix 10 versus control Mix 8). These results run counter to the Gupta U.S. Pat. No. 4,794,051 patent cited earlier herein in Col 4, lines 45-53 and 34-37, it is stated that magnesium oxide or hydroxide is too slow a hardening agent and that it is preferable to use a mixture of calcium and magnesium alkalis at a ratio of 10:1 to 0.1 to 10. Furthermore, it should be pointed out that the Gupta compositions remain thermoplastic "at about 20° C. for 24 to 100 hours or longer" (Col. 60, line 23 of Gupta) whereas the mixtures of phenolic resole resin and hardener or hardeners of this invention without retarder, harden in less than 24 hours.

TABLE 8

Effect of Magnesia Hardener Lime Ratio and Additives On Gel Time of Resole-Ester

| Mix[a] | Resin | Alkali[b] | Temp° C. | Gel Time, Minutes | Additive (2% on Resin) |
|---|---|---|---|---|---|
| 1 | A | MgO | 25 | 48 | — |
| 2 | A | 4:1 MgO/CaO | 25 | 49 | — |
| 3 | A | 3:1 MgO/CaO | 25 | 50 | — |
| 4 | A | 2:1 MgO/CaO | 25 | 52 | — |
| 5 | A | 1:1 MgO/CaO | 25 | Mix lumps, test not run | — |
| 6 | A | 2:1 MgO/CaO | 25 | 11 | NH₄Cl |
| 7 | A | 2:1 MgO/CaO | 25 | 104 | NH₄F |
| 8 | C | MgO | 60 | 54 | — |
| 9[b] | C | 2:1 MgO/CaO | 60 | 123 | — |
| 10[b] | C | 4:1 MgO/CaO | 60 | 94 | — |
| 11 | C | MgO | 60 | 62 | Melamine |
| 12 | C | MgO | 60 | 79 | Aspartic acid |
| 13 | C | MgO | 60 | 28 | — |
| 14 | C | MgO | 60 | 42 | NH₄F (0.15% on resin) |
| 15[c] | C | MgO | 60 | 47 | — |
| 16[c] | C | MgO | 60 | 63 | NH₄F (0.15% on resin) |
| 17[c] | C | MgO | 60 | 115 | Tetraethoxysilane |
| 18[c] | C | MgO | 60 | 86 | Tetraethoxysilane (1.0% on resin) |

[a] For 6 g Resin A use 0.5 g water, 1.5 g γ-Butyrolactone, 0.75 g alkali (lightburned MgO with surface area of 65 m²/g). For 8 g Resin C use 1.2 g γ-butyrolactone in Mixes 13-14, no ester in mixes 8-12 and 15-18, and 1.6 g alkali, namely the MgO, CaO or mixtures thereof in all mixes with Resin C.
[b] Mild exotherm upon addition of alkali, coalescing of particles observed.
[c] Resin stored at about 40° F. for several months.

EXAMPLE 9

This example was performed to show the effect of additives on gel times of Resin E which is a highly alkaline phenolic resole resin having a pH of about 13. The compositions of this example did not contain a magnesium hardening agent. The results of this example are shown in Table 9. Normally, with Resin E, the ethyl lactate induces hardening of the resin as shown by the gelation of Mix 1. However, all of the additives, including the chloride, which is an accelerator with the magnesium hardeners, acted as accelerators or had no effect.

TABLE 9

Effect of Additives on Gel Time OF Resin E with Ester Hardener (Resin E = Alphaset 9000 of Borden Chemical Co.)

| Mix | Additive 2% on Resin | Ester | Gel Time (25° C./Min) |
|---|---|---|---|
| 1 | None | Ethyl Lactate | 46 |
| 2 | Sodium chloride | Ethyl Lactate | 49 |

TABLE 9-continued

Effect of Additives on Gel Time OF Resin E with Ester Hardener (Resin E = Alphaset 9000 of Borden Chemical Co.)

| Mix | Additive 2% on Resin | Ester | Gel Time (25° C./Min) |
|---|---|---|---|
| 3 | Sodium sulfate | Ethyl Lactate | 49 |
| 4 | None | Triacetin | 11 |
| 5 | Ammonium chloride | Triacetin | 13 |
| 6 | Ammonium bifluoride | Triacetin | 13 |
| 7 | Ammonium sulfamate | Triacetin | 13 |
| 8 | Sodium phosphate monobasic | Triacetin | 16 |
| 9 | Sodium fluoride | Triacetin | 13 |
| 10 | Sodium sulfite | Triacetin | 15 |
| 11 | Formic acid (1.5% B.O.R.)[a] | Triacetin | 13 |

[a] Acid equivalent to 2% sodium phosphate monobasic.

EXAMPLE 10

This example shows a series of experiments (Exp.) wherein increased tensile strength is obtained in a composition containing certain accelerators in relation to the same composition without an accelerator.

The results of this example are shown in Table 10.

The composition of Example 10 consisted of: (a) refractory magnesia aggregate made up predominantly of particles having a sieve size of 14 to 48; (b) 10% of Resin F, based on the weight of aggregate; (c) 15% of gamma-butyrolactone, based on the weight of Resin F (B.O.R.); and (d) 30% of MAGOX 98 Premium, based on the weight of Resin F, said MAGOX 98 Premium being a lightburned magnesium oxide hardening agent having a surface area of 100 square meters per gram which is sold by Premier Refractories & Chemicals, Inc. The quantity of accelerator, when employed, was at a level of 1%, based on the weight of resin (B.O.R.). The tensile strength readings provided in Table 10 for this example are that of an average of 3 specimens with the parenthetical value representing the median.

Resin F is a phenol-formaldehyde resole resin having the following properties: solids of 64.12%, based on the weight of resin; a water content of 5.65%, based on the weight of resin; a free phenol content of 25.19%, based on the weight of resin; a number average molecular weight (Mn) of 107; a weight average molecular weight (Mw) of about 200; a viscosity at 25° C. of M ¼ on the Gardner-Holt scale or 325 centistokes, which is converted to about 390 centipoise. In the manufacture of Resin F, there is charged to a reactor a molar ratio of formaldehyde to phenol of 0.93 which is reacted under mild heating conditions so that 25.2% by weight of the phenol remains unreacted in the resin after distillation to reduce water to about 6% and thus also raises the molar ratio of formaldehyde reacted with phenol to a ratio of greater than one, in spite of the fact that the molar ratio of formaldehyde to phenol charged to the reactor is less than one.

The resin bonded magnesia refractory tensile specimens were prepared and tested as follows. Resin F and the magnesium hardening agent were intimately admixed with the refractory magnesia. The accelerator, when used, was added at this stage. Following this stage, the gamma-butyrolactone was added to the mixture and the mixture was further mixed for a period of about 3 or 4 minutes. A 150 gram sample of the mix was then charged to a dogbone die which was then subjected to a ramming pressure of 15 tons for one minute to produce a tensile strength specimen. The specimens, 3 inches long, 1 inch thick, and 1 inch wide at the neck, were allowed to stand 24 hours (H.) at constant temperature and humidity (R.T.) of 72° F. +/−2° F. and 51% +/−2% relative humidity prior to being subjected to breaking on a Tinius Olsen tensile test machine. Some of the dogbone specimens, after the 24 hour (H.) period at the constant temperature and humidity conditions (R.T.) were subjected to a thermal treatment of 110° C. for 2 hours and then allowed to cool to room temperature prior to breaking.

It can be seen from Table 10 that: the addition of the sulfamate accelerator increased the room temperature tensile in relation to the same composition without the sulfamate additive; and that the addition of lithium carbonate increased both the room temperature and thermal cure tensile in relation to the same composition without this additive.

TABLE 10

Effect Of Certain Accelerators On Tensile Strength of Aggregate Bound With Low Molecular Weight Phenolic Resole Resin with Magnesium Oxide Hardener and Ester Hardener

| | | Tensile Strength, psi | |
|---|---|---|---|
| Exp. | Additive | 24 H. at R.T. | 24 H. at R.T. + 2H, at 110° C. |
| 1 | None | 55 (55) | 857 (890) |
| 2 | Sodium Sulfamate (1% B.O.R.) | 183 (175) | 952 (985) |
| 3 | Lithium Carbonate (1% B.O.R.) | 135 (140) | 1035 (1060) |
| 4 | Ammonium Sulfamate (1% B.O.R.) | 132 (140) | 717 (770) |

EXAMPLE 11

In this example, compressive strength tests were made at different times on a polymer concrete composition in comparison with the same composition which also contained 2%, based on the weight of Resin A (B.O.R.), of the accelerator N,N,N$^1$,N$^1$-tetramethyl-1,3-propanediamine and additionally, in some instances 0.1%, based on the weight of resin (B.O.R.) of SAG 10, a defoamer which also acts as an air detraining agent. SAG 10 is a 10% emulsion of dimethylpolysiloxane which is sold by Union Carbide Corporation.

The compressive strength tests of this Example 11 as well as the basic composition or standard mix is that set forth previously herein in the procedure entitled "Procedure For The Preparation And Testing of Polymer Concrete For Compressive Strength." The results of this example are set forth in Table 11.

It can be seen from Table 11 that the compressive strength of the standard mix or control at room temperatures (R.T.) was less than that of the standard mix after the inclusion of the accelerator at 2%, based on the weight of resin (B.O.R.), which in turn was less than that of the standard mix plus accelerator at 2% (B.O.R.) and 0.1% (B.O.R.) of the air detraining agent. Table 11 also shows that the compressive strength of the standard mix when the accelerator and the air detraining agent were included in the composition was greater than that of the standard mix plus the accelerator under the one day of hardening age room temperature plus 2 hours thermal cure at 100° C.

TABLE 11

Compressive Strength of Polymer Concrete with Accelerator And Air Detraining Agent

| Cure Conditions | Compressive Strength, psi | | |
|---|---|---|---|
| | Standard Mix (Control) | Standard Mix + Accelerator | Standard Mix + Accelerator + Air Detraining Agent |
| 8 Hours at Room Temp. | 379 | 511 | 664 |
| | 387 | 534 | 658 |
| | 379 | 494 | 678 |
| (Average) | (382) | (513) | (667) |
| One Day at Room Temp. | 1246 | 1551 | 1729 |
| | 1291 | 1686 | 1777 |
| | 1257 | 1559 | 1876 |
| (Average) | (1265) | (1559) | (1794) |
| One Day at Room Temp. + Two Hours at 100° C. | | 5607 | 7153 |
| | | 5777 | 6664 |
| | | 5294 | 7110 |
| (Average) | | (5559) | (6976) |

EXAMPLE 12

This example shows gel times of Resin A in accordance with the procedure and composition, also referred to as standard or control composition, set forth hereinbefore entitled "Procedure For Gel Determination."

The results of this example are set forth in Table 12. Experiment (Exp.) 1 in Table 12 is the standard composition set forth in the above-mentioned procedure and consists of: 6 g of Resin A; 0.5 g of water; 1.5 g of gamma-butyrolactone; and 0.75 g of lightburned magnesium oxide hardener having a surface area of 65 square meters per gram (MgO 50).

Exp. 2 in Table 12 shows the decrease in the time required for gelation of the standard composition by addition of 2% B.O.R. of the hardening accelerator N,N,N$^1$,N$^1$-tetramethyl-1,3-propanediamine.

Exp. 3 in Table 12 shows the prolongation of the time required to gel the composition of Exp. 2 when the ester hardening agent, namely gamma-butyrolactone, is replaced with an inert solvent.

Exp. 4 in Table 12 shows that the addition of a relatively low surface area lightburned magnesium oxide hardener, namely Magchem 20M, had little effect on further shortening the time required for gel formation of the composition in Exp. 2 which contains both the gamma-butyrolactone and the lightburned magnesium oxide hardener having a surface area of 65 square meters per gram. Magchem 20M has a surface area of ten square meters per gram.

Exp. 5 in Table 12 shows that the addition of the relatively low surface area (10 square meters per gram) lightburned magnesium oxide hardening agent (Magchem 20M) had a relatively small effect on decreasing the time it takes to gel the composition of Exp. 3.

TABLE 12

Effect On Gel Times Of Resole Resin A By Gamma-Butyrolactone Hardener, Various Lightburned Magnesium Oxide Hardening Agents And N,N,N$^1$,N$^1$-Tetramethyl-1,3-Propanediamine Accelerator at 25° C.

| | Composition | Time (Minutes) |
|---|---|---|
| Exp. 1 | Control (Resin A/H2O/γ-Butyrolactone/MgO 50) (No accelerator) | 64 |
| Exp. 2 | Control + 2% N,N,N$^1$,N$^1$-tetramethyl-1,3-propanediamine (B.O.R.) Accelerator | 48 |
| Exp. 3 | The Composition of Exp. 2 but replace γ-Butyrolactone with 2-methoxyethyl ether (inert solvent) | 115 |
| Exp. 4 | The Composition of Exp. 2 but with addition of 0.75 grams (g) Magchem 20M for each 6 g of Resin A | 46 |
| Exp. 5 | The Composition of Exp. 3 but add 0.75 g Magchem 20M per each 6 g of Resin A | 94 |

EXAMPLE 13

The compositions of this example are the same as those of Example 12 except for the presence or absence of magnesium or ester hardening agents and together with Example 12 and Table 12 and the following Table 13 serve to show the synergism obtained by using both a magnesium hardening agent and an ester hardening agent in the presence of an accelerator. Thus, in Exp. 2 of Table 12, it took only 48 minutes for the composition containing the accelerator and both an ester and the magnesium hardening agent to gel. Exp. 3 of Table 12, which is identical to Exp. 2 of the same table except that it does not contain the ester hardening agent, took 115 minutes to gel. It can be seen from Table 13 that the identical composition of Exp. 2 in Table 12 but without the magnesium hardener had not gelled after 14 days. Table 13 also shows that the accelerator without the magnesium hardener or ester hardener had little, if any, effect on the viscosity increase of Resin A in relation to me use of the accelerator together with ester and magnesium hardener.

TABLE 13

Effect Of Ester Hardener And Accelerator On Viscosity at 25° C. Of Resin A Over Period Of Time

| Hours at at 25° C. | 6 g Resin A 0.5 g Water 0.12 g N,N,N$^1$,N$^1$-Tetramethyl-1,3-propanediamine (2% B.O.R.) 1.5 g γ-Butyrolactone | 6 g Resin A 0.5 g Water 0.12 g N,N,N$^1$,N$^1$-Tetramethyl-1,3-propanediamine 1.5 g 2-Methoxyethyl ether (inert solvent in place of γ-Butyrolactone) |
|---|---|---|

TABLE 13-continued

Effect Of Ester Hardener And Accelerator On Viscosity at 25° C. Of Resin A Over Period Of Time

|  | Gardner-Holt | Centistokes | Gardner-Holt | Centistokes |
|---|---|---|---|---|
| 0 | I-J (I ½) | 231 | I-J (I ½) | 233 |
| 6.5 | K-L | 288 | J-K | 263 |
| 24 | P-Q | 418 | J-K | 263 |
| 14 Days | W | 1070 | L-M | 310 |

EXAMPLE 14

This example was performed to show the effect of using a mixture of lightburned magnesium oxide hardeners of different surface areas. To a solution of 8.0 g Resin A, 0.67 g water, and 2.0 g gama butyrolactone, there was added 1.0 g lightburned magnesia having a surface area of 65 m 2/g. The mixture was strongly agitated for 1 minute and then 5.0 g of the mixture was transferred to each of two small cylindrical plastic vials (22 mm wide) and capped and allowed to stand at 72° F. +/−2° F. for 4 days. The hardened mass was removed from the vials and weighed. The hardened masses were designated as cylinders No. 1 and No. 2. These were then heated for 2 hours at 105° C., weighed and then heated for another 2 hours 135° C. and reweighed. A similar procedure was followed as above except that an additional 1.0 g of lightburned magnesia having a surface area of 10 square meters per gram was added to the same quantity of the various ingredients used to prepare cylinders No. 1 and No. 2 for a total magnesia of 2.0 g per 8 g of Resin A and the samples designated as cylinders No. 3 and No. 4. The results are shown in Table 14 wherein the compressive failure was measured on a Tinius Olsen tensile test machine. It can be seen from Table 14 that samples with additional magnesia lose less weight and have higher crush strengths than samples with 50% less magnesia. The effect on gel time was minimal, as can be seen in Table 1, Mix 1, in that the mixture of magnesias had a gel time of 62 minutes for samples No. 3 and No. 4 as compared to 67 minutes for the samples No. 1 and No. 2. Following the same procedure as in this example, various accelerators such as ammonium sulfamate, sodium chloride, pentane-2,4-dione, and 2,2¹-bipyridine can be added to such compositions containing mixed surface area magnesium to obtain higher strength while shortening the time it takes to gel or harden binder, raw, batch, and other compositions of this invention.

TABLE 14

Effect of a Mixture of Lightburned Magnesium Oxides Having Different Surface Areas in Binder Compositions

| Cylinder | Weight In Grams | | | Pounds To Compressive Failure |
|---|---|---|---|---|
|  | Unheated | 2 Hours at 105° C. | 2 Hours at 135° C. |  |
| 1 | 4.99 | 4.79 | 4.65 | 2755 |
| 2 | 4.98 | 4.79 | 4.65 | 2855 |
| 3 | 4.98 | 4.85 | 4.77 | 3495 |
| 4 | 4.96 | 4.83 | 4.75 | 3545 |

What is claimed is:

1. A raw batch composition comprising a mixture of:
   A. an aggregate material;
   B. a hardenable phenolic resole resin having a pH of about 5 to 9, a resin solids content of about 50% to 90% by weight of said resin, and a viscosity of about 100 to 4,000 cps at 25° C.;
   C. from about 5% to 40% by weight of the resin of a magnesium hardening agent selected from the group consisting of magnesium hydroxide and lightburned magnesium oxide said magnesium oxide having a surface area of at least 10 square meters per gram;
   D. an accelerator in an amount sufficient to accelerate the hardening of said mixture,
   wherein the accelerator is a chelating agent selected from the group consisting of pentane-2,4-dione, heptane-2,4-dione, 2,2'-bipyridine and benzoylacetone.

2. The composition of claim 1 wherein: the pH of the resin is from about 5 to 8.5; the quantity of resin is from about 3% to 20% by weight based on the aggregate; and the mixture includes an ester functional hardening agent in an amount sufficient to increase the rate of hardening of the mixture.

3. A composition of claim 2 which has been hardened at ambient temperature.

4. The composition of claim 2 wherein: the magnesium hardening agent is magnesium oxide having a surface area of about 10 to 200 square meters per gram; and the mixture includes fibers in an amount sufficient to improve the flexural strength of the composition on hardening.

5. The composition of claim 4 wherein: the aggregate is sand; and the composition includes from about 0.1% to 1.5% based on the weight of resin of a silane adhesion promoter and from about 0.005% to 0.1% an air detraining agent.

6. A thermally cured composition of claim 2.

7. The composition of claim 2 wherein the aggregate is a member selected from the group consisting of: refractory grade magnesia; alumina; zirconia; silica; silicon carbide; silicon nitride; boron nitride; bauxite; quartz; corumdum; zircon sand; olivine sand; and mixtures thereof.

8. The composition of claim 2 rein the phenolic resole resin is the condensation product of phenol and formaldehyde and the composition includes a filler.

9. The composition of claim 7 which further includes from about 5% to 25% of graphite based on the weight of the aggregate and from about 1% to 5% by weight of the aggregate of a metal powder selected from the group consisting of aluminum, magnesium, and silicon.

10. A composition of claim 9 which has been hardened at ambient temperature.

11. A composition of claim 9 which has been thermally cured.

12. The composition of claim 1 wherein the magnesium hardening agent is lightburned magnesium oxide.

13. The composition of claim 1 wherein the phenolic resole resin is the condensation product of phenol and formaldehyde.

14. The composition of claim 2 wherein the quantity of ester functional hardening agent is from about 5% to 40% by weight of the resin.

* * * * *